(12) United States Patent
Mizusaki et al.

(10) Patent No.: US 10,824,006 B2
(45) Date of Patent: Nov. 3, 2020

(54) LIQUID CRYSTAL DISPLAY DEVICE

(71) Applicant: SHARP KABUSHIKI KAISHA, Sakai, Osaka (JP)

(72) Inventors: Masanobu Mizusaki, Sakai (JP); Takashi Satoh, Sakai (JP); Hiroshi Tsuchiya, Sakai (JP)

(73) Assignee: SHARP KABUSHIKI KAISHA, Sakai, Osaka (JP)

(*) Notice: Subject to any disclaimer, the term of this patent is extended or adjusted under 35 U.S.C. 154(b) by 60 days.

(21) Appl. No.: 16/306,689

(22) PCT Filed: Jun. 5, 2017

(86) PCT No.: PCT/JP2017/020779
§ 371 (c)(1),
(2) Date: Dec. 3, 2018

(87) PCT Pub. No.: WO2017/213072
PCT Pub. Date: Dec. 14, 2017

(65) Prior Publication Data
US 2019/0324320 A1  Oct. 24, 2019

(30) Foreign Application Priority Data
Jun. 10, 2016 (JP) .................................. 2016-116601

(51) Int. Cl.
*G02F 1/1333* (2006.01)
*G02F 1/1335* (2006.01)
*G02F 1/1337* (2006.01)
*G02F 1/1343* (2006.01)
*C09K 19/54* (2006.01)

(52) U.S. Cl.
CPC ...... *G02F 1/133555* (2013.01); *G02F 1/1337* (2013.01); *G02F 1/1343* (2013.01); *C09K 2019/548* (2013.01)

(58) Field of Classification Search
CPC ............. C09K 2019/548; G02F 1/1333; G02F 1/1343; G02F 1/1337; G02F 1/133555
USPC ..................................................... 252/299.01
See application file for complete search history.

(56) References Cited

U.S. PATENT DOCUMENTS

| 2003/0086044 | A1 | 5/2003 | Inoue et al. |
| 2005/0253988 | A1 | 11/2005 | Inoue et al. |
| 2013/0169916 | A1 | 7/2013 | Mizusaki et al. |
| 2017/0226419 | A1 | 8/2017 | Iwashita et al. |
| 2019/0324320 | A1* | 10/2019 | Mizusaki ............... C09K 19/32 |

FOREIGN PATENT DOCUMENTS

| JP | 2012-078875 A | 4/2012 |
| WO | 2012/032857 A1 | 3/2012 |
| WO | 2015/053233 A1 | 4/2015 |
| WO | 2015/194632 A1 | 12/2015 |

* cited by examiner

*Primary Examiner* — Geraldina Visconti
(74) *Attorney, Agent, or Firm* — ScienBiziP, P.C.

(57) ABSTRACT

The present invention provides a liquid crystal display device which includes a reflective electrode, which achieves its low-voltage driving, and which suppresses flickering caused during its driving and image sticking caused by its long-term driving. The liquid crystal display device of the present invention includes: a first substrate provided with a reflective electrode configured to reflect ambient light; a second substrate facing the first substrate; a liquid crystal layer sandwiched between the first substrate and the second substrate and containing a liquid crystal material that contains a liquid crystal compound containing an alkoxy group and has negative anisotropy of dielectric constant; an alignment film provided on at least one of the first substrate and the second substrate on a side facing the liquid crystal layer; and an aromatic polymer that is present between the liquid crystal layer and the alignment film and/or within the alignment film and has a specific structure.

10 Claims, 5 Drawing Sheets

(a)

(b)

LIQUID CRYSTAL DISPLAY DEVICE

TECHNICAL FIELD

The present invention relates to a liquid crystal display device. More particularly, the present invention relates to a liquid crystal display device provided with a reflective electrode especially configured to reflect ambient light.

BACKGROUND ART

In recent years, as display devices for various electronic apparatus such as smartphones and tablet terminals, there are widely used liquid crystal display devices having advantages that they are thin and lightweight, and at the same time, can be driven at low voltage and are of low power consumption.

As liquid crystal display device having such advantages, for example, reflective liquid crystal display devices have been proposed which do not require a backlight and utilize reflection of ambient light to display images. In addition, transflective liquid crystal display devices have also been developed such that improved visibility is obtained also in dark indoors and in which images are displayed by using a backlight in dark places and utilizing reflection of ambient light in light places. Such a transflective liquid crystal display device is a liquid crystal display device which has functions of displaying images both in a transmissive mode and in a reflective mode, that is, a liquid crystal display device combining characteristics of a transmissive liquid crystal display device that high visibility is achieved also in dark places by virtue of having a backlight and characteristics of a reflective liquid crystal display device that it has low power consumption due to the use of ambient light.

Patent Literature 1 discloses a reflective liquid crystal display device having a liquid crystal sealed between a pair of substrates provided in a face-to-face format and containing a polymerizable component which undergoes photo or thermal polymerization; a reflective electrode provided on one of the substrates; and a polymer layer for imparting a pre-tilt angle to the liquid crystal molecule, the polymer layer being formed on the reflective electrode by the polymerization of the polymerizable component while applying a voltage to the liquid crystal. Patent Literature 1 also discloses a transflective liquid crystal display device having a liquid crystal sealed between a pair of substrates provided in a face-to-face format and containing a polymerizable component which undergoes photo or thermal polymerization; a light-reflecting section and a light-transmitting section provided on a surface of one of the substrates; a polymer layer for imparting a pre-tilt angle to the liquid crystal molecule, the polymer layer being formed on each of the light-reflecting section and the light-transmitting section by the polymerization of the polymerizable component while adjusting a voltage applied to the liquid crystal. In addition, Patent Literature 1 discloses liquid crystal display devices in various modes of alignment, such as vertical alignment and horizontal alignment.

CITATION LIST

Patent Literature

Patent Literature 1: JP 2012-78875 A

SUMMARY OF INVENTION

Technical Problem

However, Patent Literature 1 does not disclose any techniques capable of achieving suppression of flickering caused during their driving and image sticking caused by their long-term driving in low-voltage driving liquid crystal display devices including a reflective electrode.

The present invention has been made in view of the above state of the art and aims to provide a liquid crystal display device which includes a reflective electrode, which achieves its low-voltage driving, and which suppresses flickering caused during its driving and image sticking caused by its long-term driving.

Solution to Problem

The present inventors have noted the use of liquid crystal materials containing a liquid crystal compound that contains an alkoxy group in order to achieve the low-voltage driving of liquid crystal display devices. However, the present inventors observed that flickering and image sticking occurred when such liquid crystal materials were applied in liquid crystal display devices including a reflective electrode. By an examination of the cause of their occurrence, the present inventors found that a charge-transfer reaction occurs between the charge generated on the reflective electrode and the liquid crystal compound. Accordingly, the present inventors made various investigations concerning a method for producing a liquid crystal display device which includes a reflective electrode, which achieves its low-voltage driving, and suppresses flickering caused during its driving and image sticking caused by its long-term driving, and found that it was possible to suppress the charge-transfer reaction between the charge generated on the reflective electrode and the liquid crystal compound by using an aromatic polymer having a specific structure between the liquid crystal layer and the alignment film or in the alignment film and allowing an efficient charge-transfer reaction to occur between the charge generated on the reflective electrode and the aromatic polymer. On the basis of these findings, the present inventors have arrived at the solution to the above-mentioned problem, completing the present invention.

Accordingly, an aspect of the present invention can be directed to a liquid crystal display device having a first substrate provided with a reflective electrode configured to reflect ambient light; a second substrate facing the first substrate; a liquid crystal layer sandwiched between the first substrate and the second substrate and containing a liquid crystal material that contains a liquid crystal compound containing an alkoxy group and has negative anisotropy of dielectric constant; an alignment film provided on at least one of the first substrate and the second substrate on a side facing the liquid crystal layer; and an aromatic polymer that is present between the liquid crystal layer and the alignment film and/or within the alignment film and has a structure derived from a monomer represented by Formula (M1):

[Formula 1]

$$P^1\text{-}Sp^1\text{-}R^2\text{-}A^1\text{-}(\text{-}Z\text{-}A^2\text{-})_n R^3 \quad (M1)$$

wherein $P^1$ represents a radically polymerizable group;

$Sp^1$ represents a linear, branched, or cyclic alkylene group having 1 to 6 carbon atoms, a linear, branched, or cyclic alkyleneoxy group having 1 to 6 carbon atoms, or a direct bond;

$R^2$ represents an —O— group, an —S— group, an —NH— group, a —CO— group, a —COO— group, an —OCO— group, an —O—COO— group, an —OCH$_2$— group, a —CH$_2$O— group, an —SCH$_2$— group, a —CH$_2$S— group, an —N(CH$_3$)— group, an —N(C$_2$H$_5$)— group, an —N($C_3H_7$)— group, an —N($C_4H_9$)— group, a —$CF_2$O— group, an —O$CF_2$— group, a —$CF_2$S— group, an —S$CF_2$— group, an —N($CF_3$)— group, a —$CH_2CH_2$— group, a —$CF_2CH_2$— group, a —$CH_2CF_2$— group, a —$CF_2CF_2$— group, a —CH=CH— group, a —CF=CF— group, an —C≡C— group, a —CH=CH—COO— group, an —OCO—CH=CH— group, or a direct bond;

Z represents an —O— group, an —S— group, an —NH— group, a —COO— group, a —OCO— group, an —O—COO— group, an —O$CH_2$— group, a —$CH_2$O— group, an —S$CH_2$— group, a —$CH_2$S— group, an —N($CH_3$)— group, an —N($C_2H_5$)— group, an —N($C_3H_7$)— group, an —N($C_4H_9$)— group, a —$CF_2$O— group, an —O$CF_2$— group, a —$CF_2$S— group, an —S$CF_2$— group, an —N($CF_3$)— group, a —$CH_2CH_2$— group, a —$CF_2CH_2$— group, a —$CH_2CF_2$— group, a —$CF_2CF_2$— group, a —CH=CH— group, a —CF=CF— group, a —C≡C— group, a —CH=CH—COO— group, an —OCO—CH=CH— group, or a direct bond;

$R^3$ represents an —$R^2$-$Sp^1$-$P^1$ group, a hydrogen atom, a halogen atom, a —CN group, an —$NO_2$ group, an —NCO group, an —NCS group, an —OCN group, an —SCN group, an —$SF_5$ group, or a linear or branched alkyl group having 1 to 18 carbon atoms;

$A^1$ and $A^2$ each independently represent a 1,2-phenylene group, a 1,3-phenylene group, a 1,4-phenylene group, a naphthalene-1,4-diyl group, a naphthalene-1,5-diyl group, a naphthalene-2,6-diyl group, a decahydronaphthalene-2,6-diyl group, a 1,2,3,4-tetrahydronaphthalene-2,6-diyl group, a phenanthrene-1,6-diyl group, a phenanthrene-1,8-diyl group, a phenanthrene-2,7-diyl group, a phenanthrene-3,6-diyl group, an anthracene-1,5-diyl group, an anthracene-1,8-diyl group, an anthracene-2,6-group, or an anthracene-2,7-diyl group;

n is 0, 1, or 2;

a hydrogen atom included in $R^3$ is optionally substituted with a fluorine atom or a chlorine atom;

a —$CH_2$— group included in $R^3$ is optionally substituted with an —O— group, an —S— group, an —NH— group, a —CO— group, a —COO— group, an —OCO— group, an —O—COO— group, an —O$CH_2$— group, a —$CH_2$O— group, an —S$CH_2$— group, a —$CH_2$S— group, an —N($CH_3$)— group, an —N($C_2H_5$)— group, an —N($C_3H_7$)— group, an —N($C_4H_9$)— group, a —$CF_2$O— group, an —O$CF_2$— group, a —$CF_2$S— group, an —S$CF_2$— group, an —N($CF_3$)— group, a —$CH_2CH_2$— group, a —$CF_2CH_2$— group, a —$CH_2CF_2$— group, a —$CF_2CF_2$— group, a —CH=CH— group, a —CF=CF— group, a —C≡C— group, a —CH=CH—COO— group, or an —OCO—CH=CH— group, with the proviso that an oxygen atom and a sulfur atom are not adjacent to each other;

a —$CH_2$— group included in $A^1$ and $A^2$ is optionally substituted with an —O— group or an —S— group, with the proviso that an oxygen atom and a sulfur atom are not adjacent to each other; and one or more hydrogen atoms included in $A^1$ and $A^2$ are each optionally substituted with a fluorine atom, a chlorine atom, a —CN group, an alkyl group having 1 to 6 carbon atoms, an alkoxy group having 1 to 6 carbon atoms, an alkylcarbonyl group having 2 to 6 carbon atoms, an alkoxycarbonyl group having 2 to 6 carbon atoms, or an alkylcarbonyloxy group having 2 to 6 carbon atoms.

The monomer represented by Formula (M1) may be at least one selected from monomers represented by Formulae (M1-1) to (M1-3).

[Formula 2]

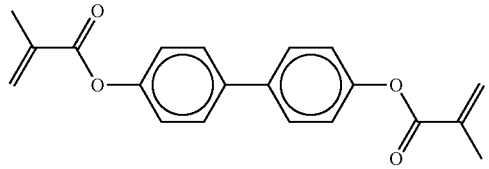

(M1-1)

[Formula 3]

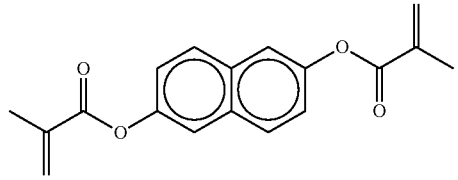

(M1-2)

[Formula 4]

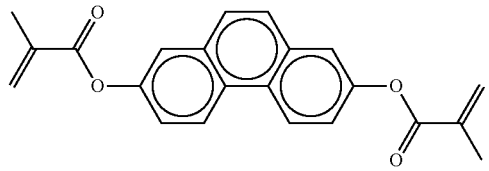

(M1-3)

The liquid crystal compound may have a structure represented by Formula (L):

[Formula 5]

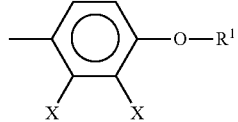

(L)

wherein Xs each independently represent a halogen atom or a hydrogen atom; $R^1$ represents a hydrocarbon group having 1 to 8 carbon atoms in which a hydrogen atom is optionally substituted with a fluorine atom.

The liquid crystal material may have an anisotropy of dielectric constant of −5.0 or less.

The reflective electrode may contain at least one selected from the group consisting of Al, Ag, Cu, Zn, and alloys thereof.

The aromatic polymer may further have a structure derived from a monomer represented by Formula (M2):

[Formula 6]

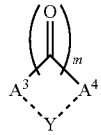

(M2)

wherein $A^3$ and $A^4$ each independently represent a phenyl group, a phenylene group, a biphenyl group, a biphenylene group, a linear or branched alkyl group having 1 to 12 carbon atoms, a linear or a branched alkylene group having 1 to 12 carbon atoms, a linear or branched alkenyl group having 2 to 12 carbon atoms, or a linear or branched alkenylene group having 2 to 12 carbon atoms, and at least one selected from $A^3$ and $A^4$ contains an -$Sp^2$-$P^2$ group;

$P^2$ represents a polymerizable group;

$Sp^2$ represents a linear, branched, or cyclic alkylene group having 1 to 6 carbon atoms, a linear, branched, or cyclic alkyleneoxy group having 1 to 6 carbon atoms, or a direct bond;

m is 1 or 2;

a dotted line connecting $A^3$ and Y and a dotted line connecting $A^4$ and Y together indicate that a bond via Y is optionally present between $A^3$ and $A^4$;

Y represents a —$CH_2$— group, a —$CH_2CH_2$— group, a —CH=CH— group, an —O— group, an —S— group, an —NH— group, an —$N(CH_3)$— group, an —$N(C_2H_5)$— group, an —$N(C_3H_7)$— group, an —$N(C_4H_9)$— group, an —$OCH_2$— group, a —$CH_2O$— group, an —$SCH_2$— group, a —$CH_2S$— group, or a direct bond;

a hydrogen atom included in $A^3$ and $A^4$ is optionally substituted with an -$Sp^2$-$P^2$ group, a halogen atom, a —CN group, an —$NO_2$ group, an —NCO group, an —NCS group, an —OCN group, an —SCN group, an —$SF_5$ group, a linear or branched alkyl group having 1 to 12 carbon atoms, a linear or branched alkenyl group having 2 to 12 carbon atoms, or a linear or branched aralkyl group having 7 to 12 carbon atoms;

two adjacent hydrogen atoms included in $A^3$ and $A^4$ are optionally substituted with a linear or branched alkylene group having 1 to 12 carbon atoms or a linear or branched alkenylene group having 2 to 12 carbon atoms to form a cyclic structure;

a hydrogen atom of the alkyl group, the alkenyl group, the alkylene group, the alkenylene group, or the aralkyl group included in $A^3$ and $A^4$ is optionally substituted with an -$Sp^2$-$P^2$ group; and a —$CH_2$— group in the alkyl group, the alkenyl group, the alkylene group, the alkenylene group, or the aralkyl group included in $A^3$ and $A^4$ is optionally substituted with an —O— group, an —S— group, an —NH— group, a —CO— group, a —COO— group, an —OCO— group, an —O—COO— group, an —$OCH_2$— group, a —$CH_2O$— group, an —$SCH_2$— group, a —$CH_2S$— group, an —$N(CH_3)$— group, an —$N(C_2H_5)$— group, an —$N(C_3H_7)$— group, an —$N(C_4H_9)$— group, a —$CF_2O$— group, an —$OCF_2$— group, a —$CF_2S$— group, an —$SCF_2$— group, an —$N(CF_3)$— group, a —$CH_2CH_2$— group, a —$CF_2CH_2$— group, a —$CH_2CF_2$— group, a —$CF_2CF_2$— group, a —CH=CH— group, a —CF=CF— group, a —C≡C— group, a —CH=CH—COO— group, or an —OCO—CH=CH— group, with the proviso that an oxygen atom, a sulfur atom, and a nitrogen atom are not adjacent to each other.

The monomer represented by Formula (M2) may be a monomer represented by Formula (M2-1).

[Formula 7]

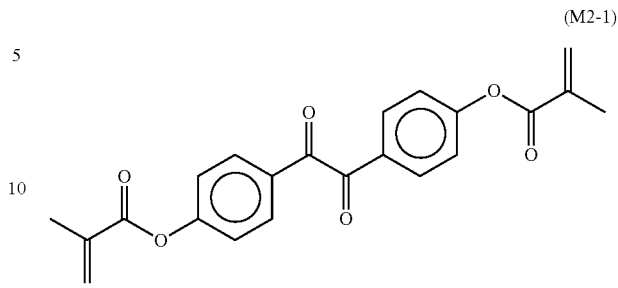

(M2-1)

The alignment film may include at least one polymer selected from a polyamic acid and a polyimide, and the at least one polymer may contain an aliphatic acid anhydride monomer unit.

The polyamic acid may have a structure represented by Formula (P-1) and the polyimide may have a structure represented by Formula (P-2):

[Formula 8]

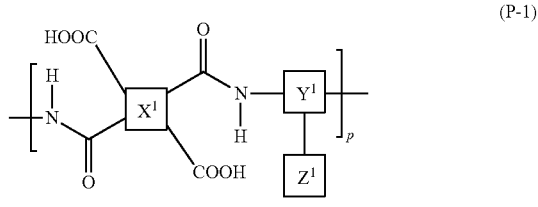

(P-1)

[Formula 9]

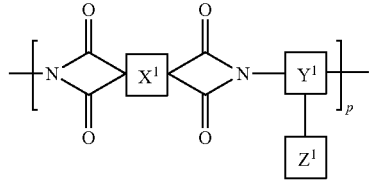

(P-2)

wherein in each of Formulae (P-1) and (P-2), $X^1$ has at least one structure selected from the group consisting of structures represented by Formulae (X-1) to (X-6); $Y^1$ represents a trivalent aromatic or aliphatic group; $Z^1$ represents a monovalent organic group or a hydrogen atom; and p represents an integer of 1 or greater.

[Formula 10]

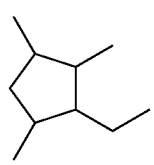

(X-1)

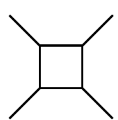

(X-2)

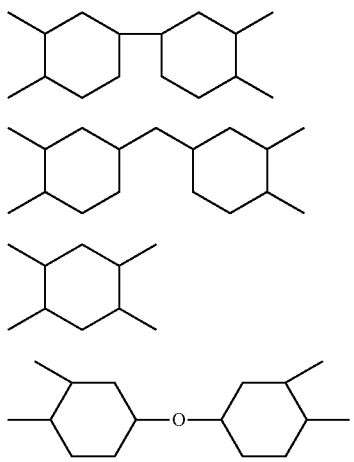

(X-3)

(X-4)

(X-5)

(X-6)

The alignment film may be a vertical alignment film.

Advantageous Effects of Invention

The present invention can provide a liquid crystal display device which includes a reflective electrode, which achieves its low-voltage driving, and which suppresses flickering caused during its driving and image sticking caused by its long-term driving.

DESCRIPTION OF EMBODIMENTS

Hereinafter, the present invention is described in more detail based on embodiments with reference to the drawings. The embodiments, however, are not intended to limit the scope of the present invention, and their configurations may appropriately be combined or modified within the spirit of the present invention.

The present invention can be applied to liquid crystal display devices both in a horizontal alignment mode and in a vertical alignment mode, and is preferably used in liquid crystal display devices especially in a vertical alignment mode.

Embodiment 1

Figure 1:
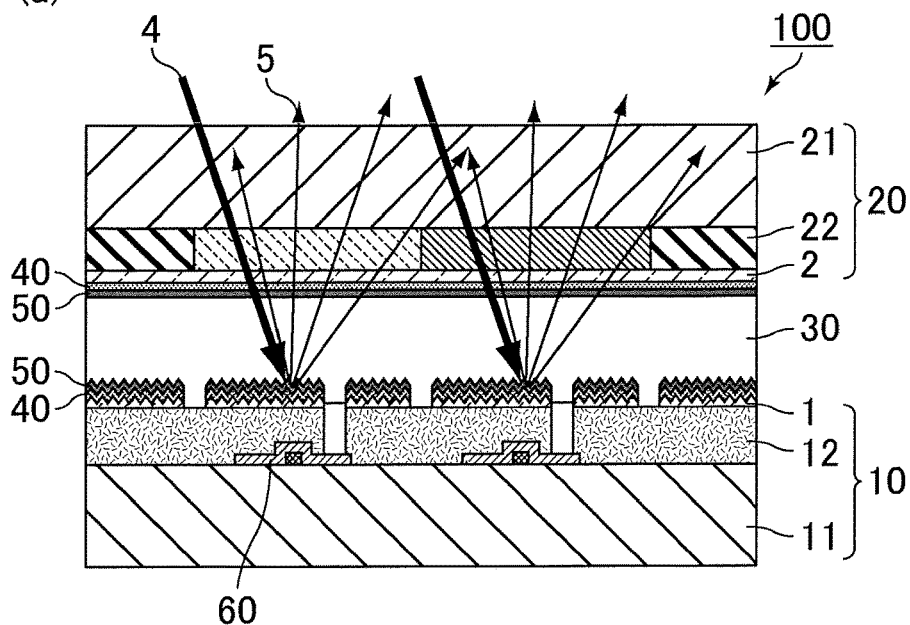
FIG. 1 depicts diagrams showing a reflective liquid crystal display device according to Embodiment 1: (a), a schematic cross-sectional view thereof; and (b), an enlarged schematic cross-sectional view of (a).
Figure 1:
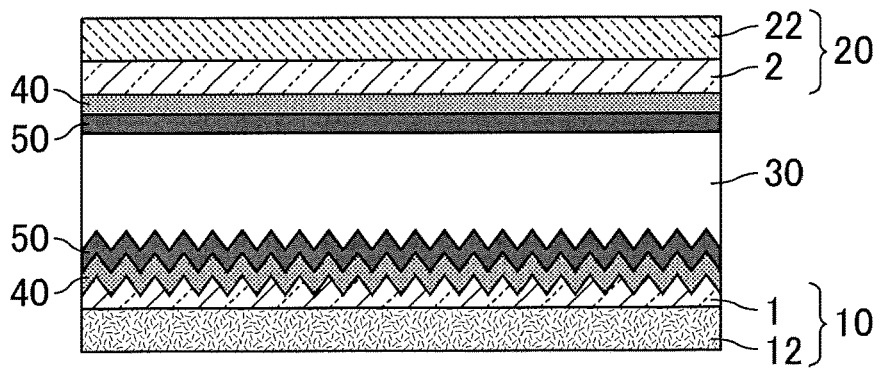

FIG. 1 depicts diagrams showing a reflective liquid crystal display device according to Embodiment 1: (a), a schematic cross-sectional view thereof; and (b), an enlarged schematic cross-sectional view of (a). As shown in FIGS. 1(a) and 1(b), a reflective liquid crystal display device 100 according to the present embodiment includes a first substrate 10 provided with a reflective electrode 1 configured to reflect ambient light; a second substrate 20 facing the first substrate 10; a liquid crystal layer 30 sandwiched between the first substrate 10 and the second substrate 20; an alignment film 40 provided on each of the first substrate 10 and the second substrate 20 on a side facing the liquid crystal layer 30; and a polymer layer 50 provided between the liquid crystal layer 30 and the alignment film 40, wherein the polymer layer 50 contains an aromatic polymer having a structure derived from a monomer represented by Formula (M1):

[Formula 11]

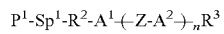 (M1)

wherein $P^1$ represents a radically polymerizable group;

$Sp^1$ represents a linear, branched, or cyclic alkylene group having 1 to 6 carbon atoms, a linear, branched, or cyclic alkyleneoxy group having 1 to 6 carbon atoms, or a direct bond;

$R^2$ represents an —O— group, an —S— group, an —NH— group, a —CO— group, a —COO— group, an —OCO— group, an —O—COO— group, an —OCH$_2$— group, a —CH$_2$O— group, an —SCH$_2$— group, a —CH$_2$S— group, an —N(CH$_3$)— group, an —N(C$_2$H$_5$)— group, an —N(C$_3$H$_7$)— group, an —N(C$_4$H$_9$)— group, a —CF$_2$O— group, an —OCF$_2$— group, a —CF$_2$S— group, an —SCF$_2$— group, an —N(CF$_3$)— group, a —CH$_2$CH$_2$— group, a —CF$_2$CH$_2$— group, a —CH$_2$CF$_2$— group, a —CF$_2$CF$_2$— group, a —CH=CH— group, a —CF=CF— group, an —C≡C— group, a —CH=CH—COO— group, an —OCO—CH=CH— group, or a direct bond;

Z represents an —O— group, an —S— group, an —NH— group, a —COO— group, a —OCO— group, an —O—COO— group, an —OCH$_2$— group, a —CH$_2$O— group, an —SCH$_2$— group, a —CH$_2$S— group, an —N(CH$_3$)— group, an —N(C$_2$H$_5$)— group, an —N(C$_3$H$_7$)— group, an —N(C$_4$H$_9$)— group, a —CF$_2$O— group, an —OCF$_2$— group, a —CF$_2$S— group, an —SCF$_2$— group, an —N(CF$_3$)— group, a —CH$_2$CH$_2$— group, a —CF$_2$CH$_2$— group, a —CH$_2$CF$_2$— group, a —CF$_2$CF$_2$— group, a —CH=CH— group, a —CF=CF— group, a —C≡C— group, a —CH=CH—COO— group, an —OCO—CH=CH— group, or a direct bond;

$R^3$ represents an —R$^2$-Sp$^1$-P$^1$ group, a hydrogen atom, a halogen atom, a —CN group, a —NO$_2$ group, an —NCO group, an —NCS group, an —OCN group, an —SCN group, an —SF$_5$ group, or a linear or branched alkyl group having 1 to 18 carbon atoms;

A¹ and A² each independently represent a 1,2-phenylene group, a 1,3-phenylene group, a 1,4-phenylene group, a naphthalene-1,4-diyl group, a naphthalene-1,5-diyl group, a naphthalene-2,6-diyl group, a decahydronaphthalene-2,6-diyl group, a 1,2,3,4-tetrahydronaphthalene-2,6-diyl group, a phenanthrene-1,6-diyl group, a phenanthrene-1,8-diyl group, a phenanthrene-2,7-diyl group, a phenanthrene-3,6-diyl group, an anthracene-1,5-diyl group, an anthracene-1,8-diyl group, an anthracene-2,6-group, or an anthracene-2,7-diyl group;

n is 0, 1, or 2;

a hydrogen atom included in $R^3$ is optionally substituted with a fluorine atom or a chlorine atom;

a —$CH_2$— group included in $R^3$ is optionally substituted with an —O— group, an —S— group, an —NH— group, a —CO— group, a —COO— group, an —OCO— group, an —O—COO— group, an —$OCH_2$— group, a —$CH_2O$— group, an —$SCH_2$— group, a —$CH_2S$— group, an —$N(CH_3)$— group, an —$N(C_2H_5)$— group, an —$N(C_3H_7)$— group, an —$N(C_4H_9)$— group, a —$CF_2O$— group, an —$OCF_2$— group, a —$CF_2S$— group, an —$SCF_2$— group, an —$N(CF_3)$— group, a —$CH_2CH_2$— group, a —$CF_2CH_2$— group, a —$CH_2CF_2$— group, a —$CF_2CF_2$— group, a —CH═CH— group, a —CF═CF— group, a —C≡C— group, a —CH═CH—COO— group, or an —OCO—CH═CH— group, with the proviso that an oxygen atom and a sulfur atom are not adjacent to each other;

a —$CH_2$— group included in A¹ and A² is optionally substituted with an —O— group or an —S— group, with the proviso that an oxygen atom and a sulfur atom are not adjacent to each other; and one or more hydrogen atoms included in A¹ and A² are each optionally substituted with a fluorine atom, a chlorine atom, a —CN group, an alkyl group having 1 to 6 carbon atoms, an alkoxy group having 1 to 6 carbon atoms, an alkylcarbonyl group having 2 to 6 carbon atoms, an alkoxycarbonyl group having 2 to 6 carbon atoms, or an alkylcarbonyloxy group having 2 to 6 carbon atoms.

In the reflective liquid crystal display device 100, the first substrate 10 includes TFTs 60, and includes a transparent substrate 11, an insulating film 12, and a reflective electrode 1 in order from the transparent substrate toward the liquid crystal layer 30. The second substrate 20 includes a transparent substrate 21, a color filter 22, and a common electrode 2 in order from the second substrate toward the liquid crystal layer 30.

In the reflective liquid crystal display device 100, since the polymer layer 50 includes an aromatic polymer having a specific structure, an efficient charge-transfer reaction occurs between the aromatic group on the aromatic polymer and the charge generated on the reflective electrode 1, making it possible to suppress the charge-transfer reaction within the liquid crystal layer 30. This in turn allows the device to suppress flickering caused during its driving and image sticking caused by its long-term driving. A more detailed description is given below.

A low-voltage-driven reflective liquid crystal display device in a vertical alignment mode uses, for example, a liquid crystal material having an anisotropy of dielectric constant (As) of −5.0 or less. Such a liquid crystal materials having negative anisotropy of dielectric constant may include a liquid crystal compound having a structure represented by Formula (L):

[Formula 12]

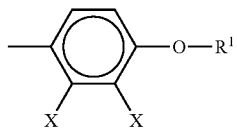

(L)

wherein Xs each independently represent a halogen atom or a hydrogen atom; and $R^1$ represents a hydrocarbon group having 1 to 8 carbon atoms in which a hydrogen atom is optionally substituted with a fluorine atom.

Like the liquid crystal compound having a structure represented by Formula (L), a liquid crystal compound containing an alkoxy group undergoes cleavage by the charge (electron or hole) injected through an electrode, forming radicals and ions (anions or cations), as shown below in Formulae 1 to 4.

[Formula 13]

(Formula 1)

[Formula 14]

(Formula 2)

[Formula 15]

(Formula 3)

[Formula 16]

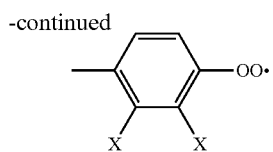

(Formula 4)

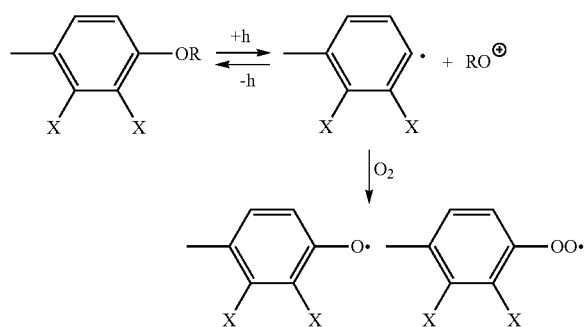

In reflective liquid crystal display devices, there are used electrodes with reflective function, such as those made of Al, Ag, Cu, and Zn, in order to reflect ambient light. Such reflective electrodes have higher activity and are more prone to ionization, and thus are more subject to charge injection, relative to general transparent electrodes, such as those made of ITO and IZO. Therefore, some of the charges injected through the reflective electrode react with the liquid crystal compound, whereby it becomes likely that the cleavage reactions as shown in Formulae 1 to 4 take place. The anions and cations generated by the cleavage reactions as shown in Formulae 1 to 4 results in the neutralization reactions shown below in Formula 5, whereas the radicals remain unreacted and thus causes flickering, image sticking, etc. On the other hand, when the phenylene group moiety in Formulae 1 to 4 is changed to a biphenylene group or a terphenylene group and the conjugation is expanded accordingly, the π-conjugation increases and the reactivity is higher, making the cleavage reactions more prone to take place.

 [Formula 17]

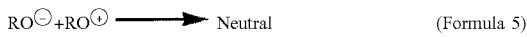 (Formula 5)

Therefore, in the reflective liquid crystal display device 100, a polymer layer 50 containing an aromatic polymer having a specific structure is provided between the liquid crystal layer 30 and the alignment film 40 such that the charge-transfer reaction shown below in Formula 6 preferentially take place between the charge injected through the reflection electrode 1 and the aromatic polymer, in order to achieve the suppression of the charge-transfer reaction between the charge injected through the reflective electrode 1 and the liquid crystal compound.

[Formula 18]

(Formula 6)

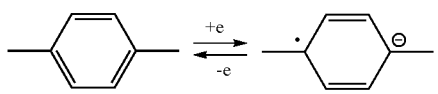

An aromatic polymer has low molecular mobility, and thus, even though a radical is generated in an aromatic polymer, there is a low possibility that the radical comes into contact with the liquid crystal compound in the liquid crystal layer 30, and it is possible to suppress the occurrence of flickering and image sticking. In addition, the formation of an aromatic polymer by polymerizing a monomer including more than one condensed ring structure, phenylene structure, benzophenone structure, or benzyl structure makes it possible that the charge-transfer reaction occurs more efficiently between the charge applied through the reflective electrode 1 and the aromatic polymer, allowing further suppression of the occurrence of flickering and image sticking.

<Substrate>

The first substrate 10 suitably is an array substrate. In the present embodiment, the first substrate 10 includes reflective electrodes 1 in the corresponding upper layers on the transparent substrate 11 on a side facing the liquid crystal layer 30. Examples of the transparent substrate 11 include, for example, a glass substrate, a plastic substrate, and others.

The second substrate 20 suitably is a color filter substrate. In the present embodiment, the second substrate 20 includes color filters 22 and a common electrode 2 in the corresponding upper layers on the transparent substrate 21 on a side facing the liquid crystal layer 30. Examples of the transparent substrate 21 include, for example, a glass substrate, a plastic substrate, and others. The combination of colors for the color filter 22 is not limited in particular, and includes, for example, a combination of red, green, and blue, a combination of red, green, blue, and yellow, and others.

The first substrate 10 and the second substrate 20 are attached to each other with a sealing agent so as to sandwich the liquid crystal layer 30 therebetween. The sealing agent can be one hardened by heat, one hardened by ultraviolet irradiation, or a mixture of these.

(Electrode)

The reflective liquid crystal display device 100 includes pixel electrodes and a common electrode. In the present embodiment, the reflective electrode 1 provided for the first substrate 10 is a pixel electrode, and the second substrate 20 includes a common electrode 2.

The reflective liquid crystal display device 100 allows images to be displayed by using the reflective electrode 1 to reflect the light coming from the outside within the device, that is, without the use of a backlight, and achieves low power consumption.

The reflective electrode 1 is an electrode that reflects ambient light 4 to generate reflected light 5, and is composed of a material with high reflectance. The reflective electrode 1 includes an irregular surface, in order to achieve more efficient reflection of ambient light 4. As described above, the reflective liquid crystal display device 100 uses as a pixel electrode, a reflective electrode 1 having an irregular surface, and has a micro reflective electrode structure, an MRS (Micro Reflective Structure) structure imparting a light-reflective function to an electrode itself which is driven by a TFT 60. The reflective liquid crystal display device 100 includes TFTs 60, but alternatively may be a passive drive liquid crystal display device without TFTs.

The reflective electrode 1 preferably contains at least one selected from the group consisting of Al, Ag, Cu, Zn, and alloys thereof.

The material for the common electrode 2 employs a transparent conductive material, such as indium tin oxide (ITO), indium zinc oxide (IZO), zinc oxide (ZnO), and tin oxide (SnO), or an alloy thereof.

Figure 2:
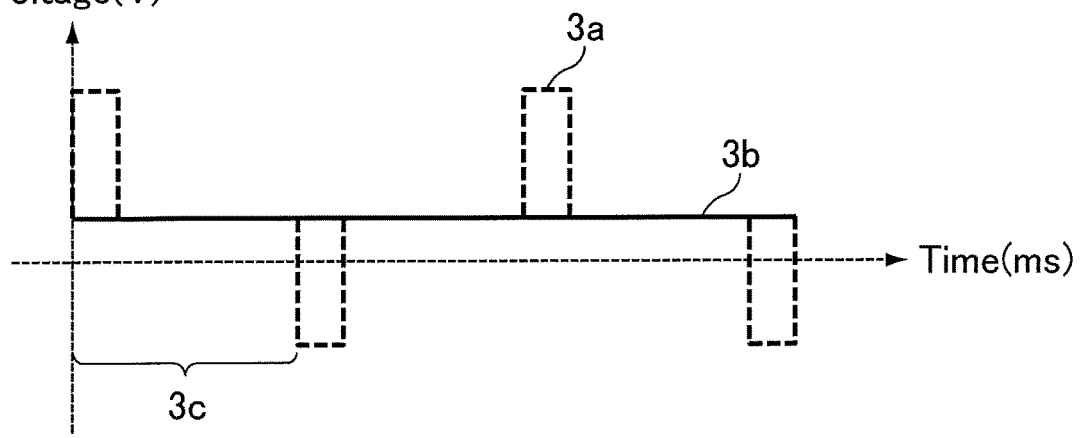
FIG. 2 is a schematic diagram showing waveforms of voltage applied through a pixel electrode and a common electrode in Embodiment 1.

FIG. 2 is a schematic diagram showing voltage waveforms applied through a pixel electrode and a common electrode in Embodiment 1. FIG. 2 shows a voltage 3a applied through a pixel electrode, a voltage 3b applied through a common electrode, and a frame interval between applied voltage inputs, represented by 3c. A refresh rate of 60 Hz corresponds to a frame interval of 16.7 ms, and a refresh rate of 1 Hz corresponds to a frame interval of 1000 ms.

The voltage 3a applied through a pixel electrode is usually a rectangular wave voltage (pulse voltage) corresponding to the frequency and resolution, as shown in FIG. 2, and is variable. When the refresh rate is 60 Hz and the resolution is of full high vision, the time of a voltage pulse applied is as short as approximately 15 µs. In general, when a pixel electrode and a dielectric material are in contact with each other, charge interactions (transfer of electrons or holes) occur between free electrons within the molecules, or the π-conjugated substance, constituting the dielectric material, and the pixel electrode, instantaneously at the moment when the applied voltage value varies. Therefore, when a compound having an aromatic group is contained in the dielectric material in contact with the pixel electrode, electrons will flow from the pixel electrode into the aromatic group, or vice versus, at the moment when the voltage value varies. When such electron transfer from or into the aromatic group (redox reaction) continuously takes place during the driving of the liquid crystal display device, ions are finally formed from the aromatic group, leading to the occurrence of flickering and image sticking. In addition, when an electrode material of a highly active metal or the like (Al, Ag, Cu, Zn, or an alloy thereof) is used for the pixel electrode, electrons or holes are prone to be formed on the metal surface, whereby the charge transfer into the dielectric material becomes easier to occur.

Usually, a constant voltage is only input through the common electrode (in this case, a voltage value not subject to DC offset is selected). When only a constant voltage is input as described, there is no fluctuation in the applied voltage over time, so that an equilibrium state is immediately brought about between the electrode and the dielectric material, resulting in no occurrence of the charge interaction therebetween, and consequently the redox reaction therebetween. Therefore, even though the common electrode is in contact with a dielectric material containing a compound having an aromatic group, ionization does not occur or occurs with great difficulty.

For these reasons, the charge transfer from the pixel electrode is more likely to occur, relative to that from the common electrode. Since the present embodiment uses the reflective electrode 1 as a pixel electrode, the charge transfer into the dielectric material is more likely to occur, while the charge-transfer reaction between the reflective electrode 1 and the liquid crystal layer 30 can be suppressed by the fact that an aromatic polymer having a specific structure is present between the liquid crystal layer 30 and the alignment film 40.

<Liquid Crystal Layer>

In the present embodiment, the liquid crystal layer 30 is composed of a liquid crystal material having negative anisotropy of dielectric constant (which is also referred to as a negative liquid crystal material). Such a liquid crystal material contains a liquid crystal compound containing an alkoxy group and can achieve low-voltage driving by decreasing the Δε value (or by increasing the absolute value of Δε). A liquid crystal compound containing an alkoxy group reacts with the charge generated on an electrode or the like and undergoes the cleavage thereof, leading to the generation of a radical. However, the reflective liquid crystal display device 100 is provided with an aromatic polymer-containing polymer layer 50, and thus the charge-transfer reaction occurs preferentially between the liquid crystal compound and the aromatic polymer, thereby making it possible to suppress the cleavage reaction of the liquid crystal compound.

The liquid crystal compound containing an alkoxy group is preferably a compound having a structure represented above by Formula (L). The use of a liquid crystal compound having a structure represented above by Formula (L) increases the absolute value of negative anisotropy of dielectric constant, and can achieve the lower-voltage driving.

In Formula (L) described above, Xs each independently represent a halogen atom or a hydrogen atom. The halogen atom includes, for example, a fluorine atom, a chlorine atom, and a bromine atom, with a fluorine atom being preferable. The multiple Xs present in Formula (L) may be the same or different.

In Formula (L) described above, $R^1$ represents a hydrocarbon group having 1 to 8 carbon atoms. Preference is given to a hydrocarbon group having 1 to 5 carbon atoms, from the viewpoint of lowering the viscosity of the liquid crystal material. In addition, combinations with a liquid crystal compound having a larger number of carbon atoms can result in a wider range of temperatures for the liquid crystal layer.

Liquid crystal compounds having a structure represented by Formula (L) are preferably compounds represented by Formulae (L1) to (L5):

[Formula 19]

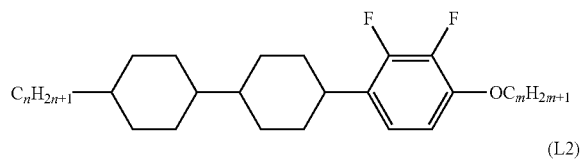

(L1)

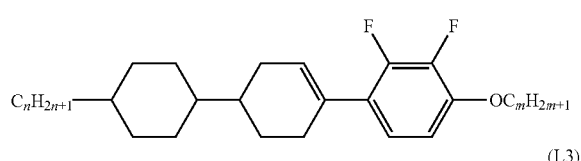

(L2)

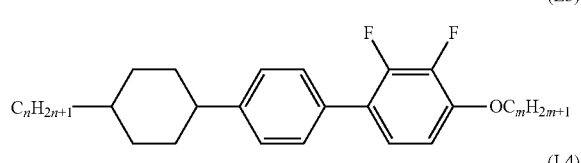

(L3)

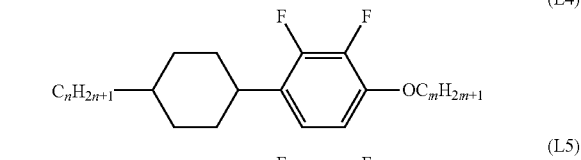

(L4)

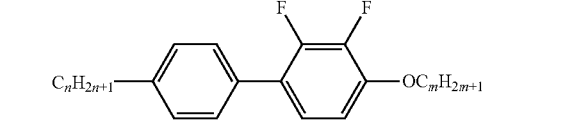

(L5)

in each of these formulae, m represents an integer of 1 to 8, n represents an integer of 1 to 8, and a hydrogen atom is optionally substituted with a halogen atom.

An example of a compound represented by Formula (L3) is a compound represented by Formula (L3-1):

[Formula 20]

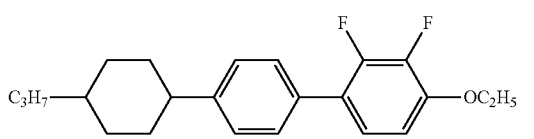

(L3-1)

wherein a hydrogen atom is optionally substituted with a halogen atom.

The anisotropy of dielectric constant (Δε) of a liquid crystal material having negative anisotropy of dielectric constant is preferably −5.0 or less, more preferably −5.5 or less, and further preferably −6.0 or less. When the anisotropy of dielectric constant of a liquid crystal material having negative anisotropy of dielectric constant is set in the above-mentioned range, the liquid crystal material can be more suitably used in a liquid crystal display device for which low-voltage driving is required.

Herein, the anisotropy of dielectric constant (Δε) is defined by Formula (L):

Δε=(dielectric constant in the major axis direction)−(dielectric constant in the minor axis direction)    (L)

The anisotropy of dielectric constant (Δε) of a liquid crystal material can be determined by preparing a liquid crystal cell in a horizontal or vertical alignment and using the capacitance values before and after applying a high voltage to the cell to calculate the dielectric constants in the major axis direction and in the minor axis direction.

The liquid crystal material having negative anisotropy of dielectric constant may contain a liquid crystal compound other than a liquid crystal compound containing an alkoxy group.

<Polymer Layer>

In the present embodiment, the polymer layer 50 is located between the liquid crystal layer 30 and the alignment film 40 and contains an aromatic polymer described below. Note that the polymer layer 50 may be provided within the alignment film 40.

(Aromatic Polymer)

In the present embodiment, the aromatic polymer has a structure derived from a monomer represented by Formula (M1). The aromatic polymer is contained in the polymer layer 50, or alternatively may be present within the alignment film without forming a polymer layer. Note that a polymer having a structure derived from a monomer represented by Formula (M1) is a polymer obtained by polymerization of the monomer.

Since the aromatic polymer-containing polymer layer 50 is present between the liquid crystal layer 30 and the alignment film 40, an efficient charge-transfer reaction occurs between the charge generated on the reflective electrode 1 and the aromatic polymer, there is a reduced possibility that the charge injection into the liquid crystal layer 30 takes place, and the charge-transfer reaction in the liquid crystal layer 30 is suppressed, thereby allowing the device to suppress flickering caused during its driving and image sticking caused by its long-term driving.

[Formula 21]

$P^1\text{-}Sp^1\text{-}R^2\text{-}A^1\text{-}(\text{-}Z\text{-}A^2\text{-})_n\text{-}R^3$    (M1)

wherein $P^1$ represents a radically polymerizable group;

$Sp^1$ represents a linear, branched, or cyclic alkylene group having 1 to 6 carbon atoms, a linear, branched, or cyclic alkyleneoxy group having 1 to 6 carbon atoms, or a direct bond;

$R^2$ represents an —O— group, an —S— group, an —NH— group, a —CO— group, a —COO— group, an —OCO— group, an —O—COO— group, an —OCH$_2$— group, a —CH$_2$O— group, an —SCH$_2$— group, a —CH$_2$S— group, an —N(CH$_3$)— group, an —N(C$_2$H$_5$)— group, an —N(C$_3$H$_7$)— group, an —N(C$_4$H$_9$)— group, a —CF$_2$O— group, an —OCF$_2$— group, a —CF$_2$S— group, an —SCF$_2$— group, an —N(CF$_3$)— group, a —CH$_2$CH$_2$— group, a —CF$_2$CH$_2$— group, a —CH$_2$CF$_2$— group, a —CF$_2$CF$_2$— group, a —CH=CH— group, a —CF=CF— group, an —C≡C— group, a —CH=CH—COO— group, an —OCO—CH=CH— group, or a direct bond;

Z represents an —O— group, an —S— group, an —NH— group, a —COO— group, a —OCO— group, an —O—COO— group, an —OCH$_2$— group, a —CH$_2$O— group, an —SCH$_2$— group, a —CH$_2$S— group, an —N(CH$_3$)— group, an —N(C$_2$H$_5$)— group, an —N(C$_3$H$_7$)— group, an —N(C$_4$H$_9$)— group, a —CF$_2$O— group, an —OCF$_2$— group, a —CF$_2$S— group, an —SCF$_2$— group, an —N(CF$_3$)— group, a —CH$_2$CH$_2$— group, a —CF$_2$CH$_2$— group, a —CH$_2$CF$_2$— group, a —CF$_2$CF$_2$— group, a —CH=CH— group, a —CF=CF— group, a —C≡C— group, a —CH=CH—COO— group, an —OCO—CH=CH— group, or a direct bond;

$R^3$ represents an —$R^2$-$Sp^1$-$P^1$ group, a hydrogen atom, a halogen atom, a —CN group, an —NO$_2$ group, an —NCO group, an —NCS group, an —OCN group, an —SCN group, an —SF$_5$ group, or a linear or branched alkyl group having 1 to 18 carbon atoms;

$A^1$ and $A^2$ each independently represent a 1,2-phenylene group, a 1,3-phenylene group, a 1,4-phenylene group, a naphthalene-1,4-diyl group, a naphthalene-1,5-diyl group, a naphthalene-2,6-diyl group, a decahydronaphthalene-2,6-diyl group, a 1,2,3,4-tetrahydronaphthalene-2,6-diyl group, a phenanthrene-1,6-diyl group, a phenanthrene-1,8-diyl group, a phenanthrene-2,7-diyl group, a phenanthrene-3,6-diyl group, an anthracene-1,5-diyl group, an anthracene-1,8-diyl group, an anthracene-2,6-group, or an anthracene-2,7-diyl group;

n is 0, 1, or 2;

a hydrogen atom included in $R^3$ is optionally substituted with a fluorine atom or a chlorine atom;

a —CH$_2$— group included in $R^3$ is optionally substituted with an —O— group, an —S— group, an —NH— group, a —CO— group, a —COO— group, an —OCO— group, an —O—COO— group, an —OCH$_2$— group, a —CH$_2$O— group, an —SCH$_2$— group, a —CH$_2$S— group, an —N(CH$_3$)— group, an —N(C$_2$H$_5$)— group, an —N(C$_3$H$_7$)— group, an —N(C$_4$H$_9$)— group, a —CF$_2$O— group, an —OCF$_2$— group, a —CF$_2$S— group, an —SCF$_2$— group, an —N(CF$_3$)— group, a —CH$_2$CH$_2$— group, a —CF$_2$CH$_2$— group, a —CH$_2$CF$_2$— group, a —CF$_2$CF$_2$— group, a —CH=CH— group, a —CF=CF— group, a —C≡C— group, a —CH=CH—COO— group, or an —OCO—CH=CH— group, with the proviso that an oxygen atom and a sulfur atom are not adjacent to each other;

a —CH$_2$— group included in $A^1$ and $A^2$ is optionally substituted with an —O— group or an —S— group, with the proviso that an oxygen atom and a sulfur atom are not adjacent to each other; and one or more hydrogen atoms included in $A^1$ and $A^2$ are each optionally substituted with a fluorine atom, a chlorine atom, a —CN group, an alkyl group having 1 to 6 carbon atoms, an alkoxy group having 1 to 6 carbon atoms, an alkylcarbonyl group having 2 to 6 carbon atoms, an alkoxycarbonyl group having 2 to 6 carbon atoms, or an alkylcarbonyloxy group having 2 to 6 carbon atoms.

P¹ in Formula (M1) represents a radically polymerizable group, examples of which are include an acrylate group, a methacrylate group, an acrylamide group, a methacrylamide group, a vinyl group, or a vinyloxy group. In an aspect, the radically polymerizable group is preferably an acrylate group, an acrylamide group, a vinyl group, or a vinyloxy group from the viewpoint of improving the reaction rate. In another aspect, the radically polymerizable group is preferably a methacrylate group or a methacrylamide group from the viewpoint that the improvement in the rigidity of the polymer layer stabilizes the tilt angle.

In an aspect, Sp¹ in Formula (M1) is preferably a direct bond from the viewpoint that the improvement in the rigidity of the polymer layer stabilizes the tilt angle. In another aspect, Sp¹ in Formula (M1) is preferably a linear alkylene group or alkyleneoxy group from the viewpoint of improving the monomer polymerization rate.

A monomer represented by Formula (M1) is preferably a monomer containing a phenanthrene with an extended, condensed ring structure. More preferably, A¹ and A² in Formula (M1) are each independently a phenanthrene-1,6-diyl group, a phenanthrene-1,8-diyl group, a phenanthrene-2,7-diyl group, or a phenanthrene-3,6-diyl group. This allows the charge-transfer reaction to occur more efficiently between the charge generated on the reflective electrode 1 and the aromatic polymer.

Z in Formula (M1) is preferably a direct bond.

R³ in Formula (M1) is preferably an —R²-Sp¹-P¹ group.

It is preferable that in Formula (M1), P¹ is an acrylate group or a methacrylate group, Sp¹ is a direct bond, R² is a direct bond, A and A² are independently a 1,4-phenylene group, a 2,6-naphthalene group, or a 2,7-phenanthrene group, Z is a direct bond, R³ is an —R²-Sp¹-P¹ group, and n is 0 or 1. It is more preferable that in Formula (M1), P¹ is a methacrylate group, Sp¹ is a direct bond, R² is a direct bond, A¹ and A² are each independently a 1,4-phenylene group or a 2,7-phenanthrene group, Z is a direct bond, R³ is an —R²-Sp¹-P¹ group, and n is 0 or 1. These embodiments can result in an increase in the monomer polymerization rate and an enhancement in the stability of tilt angle.

The linear, branched, or cyclic alkylene group having 1 to 6 carbon atoms that is defined as Sp¹ in Formula (M1) refers to a linear alkylene group having 1 to 6 carbon atoms, a branched alkylene group having 3 to 6 carbon atoms, or a cyclic alkylene group having 3 to 6 carbon atoms.

The linear, branched, or cyclic alkyleneoxy group having 1 to 6 carbon atoms that is defined as Sp¹ in Formula (M1) refers to a linear alkyleneoxy group having 1 to 6 carbon atoms, a branched alkyleneoxy group having 2 to 6 carbon atoms, or a cyclic alkyleneoxy group having 3 to 6 carbon atoms.

The linear or branched alkyl group having 1 to 18 carbon atoms that is defined as R³ in Formula (M1) refers to a linear alkyl group having 1 to 18 carbon atoms, or a branched alkyl group having 3 to 18 carbon atoms.

Preferable examples of a monomer represented by Formula (M1) are at least one selected from monomers represented by Formulae (M1-1) to (M1-3):

[Formula 22]

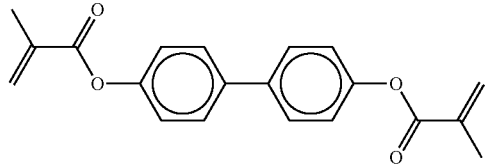
(M1-1)

[Formula 23]

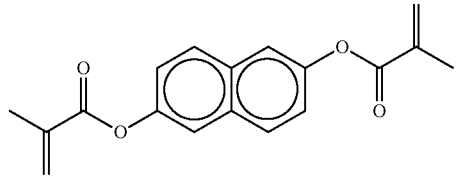
(M1-2)

[Formula 24]

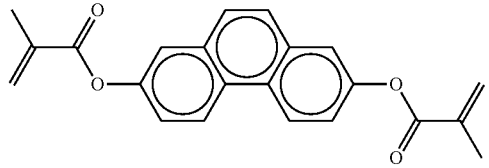
(M1-3)

The aromatic polymer preferably has a structure derived from a monomer represented by Formula (M2), in addition to a structure derived from a monomer represented by Formula (M1). Monomers represented by Formula (M2) absorb light up to about 430 nm, and thus when the aromatic polymer is synthesized using a monomer represented by Formula (M2) in addition to a monomer represented by Formula (M1), the polymerization of these monomers can be performed also in cases when light irradiation is applied from the side of the color filter substrate. A monomer represented by Formula (M2) is also referred to as a benzylic initiator monomer.

[Formula 25]

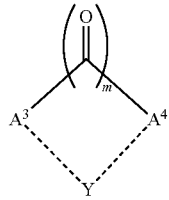
(M2)

wherein A³ and A⁴ each independently represent a phenyl group, a phenylene group, a biphenyl group, a biphenylene group, a linear or branched alkyl group having 1 to 12 carbon atoms, a linear or a branched alkylene group having 1 to 12 carbon atoms, a linear or branched alkenyl group having 2 to 12 carbon atoms, or a linear or branched alkenylene group having 2 to 12 carbon atoms, and at least one selected from A³ and A⁴ contains an -Sp²-P² group;

P² represents a polymerizable group;

Sp² represents a linear, branched, or cyclic alkylene group having 1 to 6 carbon atoms, a linear, branched, or cyclic alkyleneoxy group having 1 to 6 carbon atoms, or a direct bond;

m is 1 or 2;

a dotted line connecting $A^3$ and Y and a dotted line connecting $A^4$ and Y together indicate that a bond via Y may be present between $A^3$ and $A^4$;

Y represents a —$CH_2$— group, a —$CH_2CH_2$— group, a —CH=CH— group, an —O— group, an —S— group, an —NH— group, an —$N(CH_3)$— group, an —$N(C_2H_5)$— group, an —$N(C_3H_7)$— group, an —$N(C_4H_9)$— group, an —$OCH_2$— group, a —$CH_2O$— group, an —$SCH_2$— group, a —$CH_2S$— group, or a direct bond;

a hydrogen atom included in $A^3$ and $A^4$ is optionally substituted with an -$Sp^2$-$P^2$ group, a halogen atom, a —CN group, an —$NO_2$ group, an —NCO group, an —NCS group, an —OCN group, an —SCN group, an —$SF_5$ group, a linear or branched alkyl group having 1 to 12 carbon atoms, a linear or branched alkenyl group having 2 to 12 carbon atoms, or a linear or branched aralkyl group having 7 to 12 carbon atoms;

two adjacent hydrogen atoms included in $A^3$ and $A^4$ are optionally substituted with a linear or branched alkylene group having 1 to 12 carbon atoms or a linear or branched alkenylene group having 2 to 12 carbon atoms to form a cyclic structure;

a hydrogen atom of the alkyl group, the alkenyl group, the alkylene group, the alkenylene group, or the aralkyl group included in $A^3$ and $A^4$ is optionally substituted with an -$Sp^2$-$P^2$ group;

a —$CH_2$— group in the alkyl group, the alkenyl group, the alkylene group, the alkenylene group, or the aralkyl group included in $A^3$ and $A^4$ is optionally substituted with an —O— group, an —S— group, an —NH— group, a —CO— group, a —COO— group, an —OCO— group, an —O—COO— group, an —$OCH_2$— group, a —$CH_2O$— group, an —$SCH_2$— group, a —$CH_2S$— group, an —$N(CH_3)$— group, an —$N(C_2H_5)$— group, an —$N(C_3H_7)$— group, an —$N(C_4H_9)$— group, a —$CF_2O$— group, an —$OCF_2$— group, a —$CF_2S$— group, an —$SCF_2$— group, an —$N(CF_3)$— group, a —$CH_2CH_2$— group, a —$CF_2CH_2$— group, a —$CH_2CF_2$— group, a —$CF_2CF_2$— group, a —CH=CH— group, a —CF=CF— group, a —C≡C— group, a —CH=CH—COO— group, or an —OCO—CH=CH— group, with the proviso that an oxygen atom, a sulfur atom, and a nitrogen atom are not adjacent to each other.

$A^3$ and $A^4$ in Formula (M2) are each independently preferably a phenyl group or a phenylene group.

$P^2$ in Formula (M2) represents a polymerizable group. The polymerizable group includes a radically polymerizable group, a cationically polymerizable group, and an anionically polymerizable group, with a radical polymerizable group being preferable.

Examples of the radically polymerizable group are an acrylate group, a methacrylate group, an acrylamide group, a methacrylamide group, a vinyl group, or a vinyloxy group. In an aspect, the radically polymerizable group is preferably an acrylate group, an acrylamide group, a vinyl group, or a vinyloxy group from the viewpoint of improving the reaction rate. In another aspect, the radically polymerizable group is preferably a methacrylate group or a methacrylamide group from the viewpoint that the improvement in the rigidity of the polymer layer stabilizes the tilt angle.

In an aspect, $Sp^2$ in Formula (M2) is preferably a direct bond from the viewpoint that the improvement in the rigidity of the polymer layer stabilizes the tilt angle. In another aspect, $Sp^2$ in Formula (M2) is preferably a linear alkylene group or alkyleneoxy group from the viewpoint of improving the monomer polymerization rate.

In Formula (M2), m is preferably 1 or 2.

Y in Formula (M2) is preferably an —O— group, an —S— group, an —NH— group, or a direct bond, more preferably an —O— group or an —S— group.

It is preferable that in Formula (M2), $A^3$ and $A^4$ are each a phenylene group, $P^2$ is an acrylate group or a methacrylate group, $Sp^2$ is a direct bond, and m is 1 or 2. It is more preferable that in Formula (M2), $A^3$ and $A^4$ are each a phenylene group, $P^2$ is a methacrylate group, $Sp^2$ is a direct bond, and m is 2. These embodiments can result in an enhancement in the stability of tilt angle and a shift of the light absorption toward longer wavelengths.

The linear or branched alkyl group having 1 to 12 carbon atoms that is defined as $A^3$ and $A^4$ in Formula (M2) refers to a linear alkyl group having 1 to 12 carbon atoms, or a branched alkyl group having 3 to 12 carbon atoms.

The linear or branched alkylene group having 1 to 12 carbon atoms that is defined as $A^3$ and $A^4$ in Formula (M2) refers to a linear alkylene group having 1 to 12 carbon atoms, or a branched alkylene group having 3 to 12 carbon atoms.

The linear or branched alkenyl group having 2 to 12 carbon atoms that is defined as $A^3$ and $A^4$ in Formula (M2) refers to a linear alkenyl group having 2 to 12 carbon atoms, or a branched alkenyl group having 3 to 12 carbon atoms.

The linear or branched alkenylene group having 2 to 12 carbon atoms that is defined as $A^3$ and $A^4$ in Formula (M2) refers to a linear alkenylene group having 2 to 12 carbon atoms, or a branched alkenylene group having 3 to 12 carbon atoms.

The linear, branched, or cyclic alkylene group having 1 to 6 carbon atoms that is defined as $Sp^2$ in Formula (M2) refers to a linear alkylene group having 1 to 6 carbon atoms, a branched alkylene group having 3 to 6 carbon atoms, or a cyclic alkylene group having 3 to 6 carbon atoms.

The linear, branched, or cyclic alkyleneoxy group having 1 to 6 carbon atoms that is defined as $Sp^2$ in Formula (M2) refers to a linear alkyleneoxy group having 1 to 6 carbon atoms, a branched alkyleneoxy group having 2 to 6 carbon atoms, or a cyclic alkyleneoxy group having 3 to 6 carbon atoms.

The linear or branched alkyl group having 1 to 12 carbon atoms that is defined as $A^3$ and $A^4$ in Formula (M2) refers to a linear alkyl group having 1 to 12 carbon atoms, or a branched alkyl group having 3 to 12 carbon atoms.

The linear or branched alkenyl group having 2 to 12 carbon atoms that is defined as $A^3$ and $A^4$ in Formula (M2) refers to a linear alkenyl group having 2 to 12 carbon atoms, or a branched alkenyl group having 3 to 12 carbon atoms.

The linear or branched aralkyl group having 7 to 12 carbon atoms that is defined as $A^3$ and $A^4$ in Formula (M2) refers to a linear aralkyl group having 7 to 12 carbon atoms, or a branched aralkyl group having 8 to 12 carbon atoms.

The linear or branched alkylene group having 1 to 12 carbon atoms that is defined as $A^3$ and $A^4$ in Formula (M2) refers to a linear alkylene group having 1 to 12 carbon atoms, or a branched alkylene group having 3 to 12 carbon atoms.

The linear or branched alkenylene group having 2 to 12 carbon atoms that is defined as $A^3$ and $A^4$ in Formula (M2) refers to a linear alkenylene group having 2 to 12 carbon atoms, or a branched alkenylene group having 3 to 12 carbon atoms.

A preferable example of a monomer represented by Formula (M2) is a monomer represented by Formula (M2-

1). The monomer represented by Formula (M2-1) absorbs light particularly at long wavelengths and is capable of absorbing light at wavelengths up to 430 nm or 440 nm.

[Formula 26]

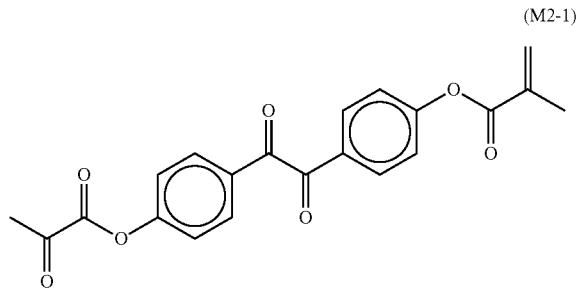

(M2-1)

In the present embodiment, the aromatic polymer can be formed, for example, by two methods described below:

(1) In the formation of the liquid crystal layer 30, the polymer layer 50 which contains the aromatic polymer between the liquid crystal layer 30 and the alignment film 40 is formed by using a composition in which a monomer represented by Formula (M1) is dissolved and polymerizing the monomer.

(2) In the formation of the alignment film 40, the aromatic polymer is formed within the alignment film 40 by using a composition in which a monomer represented by Formula (M1) is dissolved and polymerizing the monomer. In this case, the aromatic polymer may or may not form a polymer layer.

The method (1) is one in which a polymer sustained alignment (PSA) technique is used to form the aromatic polymer. The PSA technique is one in which a liquid crystal composition containing a polymerizable monomer is sealed between a pair of substrates, followed by polymerization of the polymerizable monomer to form the polymerized material (polymer) on the surface of the alignment film.

In cases when the aromatic polymer-containing polymer layer 50 is formed using the method (1), if some molecules of the monomer represented by Formula (M1) remains in the liquid crystal layer 30, then there is a possibility that the reaction shown above in Formula 6 occurs between the monomer represented by Formula (M1) and the charge injected through the reflective electrode 1, leading to the generation of radicals and ions in the liquid crystal layer 30 and the occurrence of flickering and image sticking. In the method (2), on the other hand, the monomer represented by Formula (M1) is contained in the composition used in the formation of the alignment film 40, and thus, in principle, the monomer molecules do not remain in the liquid crystal layer 30 as in the method (1), which allows greater suppression of the occurrence of flickering and image sticking.

<Alignment Film>

The alignment film 40 has a function of controlling the alignment of the liquid crystal compound in the liquid crystal layer 30. The alignment of the liquid crystal compound in the liquid crystal layer 30 is controlled mainly by the action of the alignment film 40 when the voltage applied to the liquid crystal layer 30 is less than the threshold voltage (including when no voltage is applied). In this state (hereinafter also referred to as an initial alignment state), the angle formed by the major axis of the liquid crystal compound with respect to the surfaces of the first substrate 10 and the second substrate 20 is called a "pre-tilt angle". Note that in this specification, the "pre-tilt angle" describes the angle of inclination of the liquid crystal compound against a direction parallel to the substrate surface, wherein the angle when the liquid crystal molecule is parallel to the substrate surface is 0° and the angle when the liquid crystal molecule is parallel to the normal of the substrate surface is 90°.

The alignment film 40 may allow the liquid crystal compound to align within the liquid crystal layer 30 in a substantially vertical direction (a vertical alignment film) or in a substantially horizontal direction (a horizontal alignment film). In the case when the alignment film is a vertical alignment film, substantially vertical preferably means that the pre-tilt angle is 85° or more and 90° or less. In the case when the alignment film is a horizontal alignment film, substantially horizontal preferably means that the pre-tilt angle is 00 or more and 50 or less.

The method of applying alignment treatment to the alignment film 40 is not limited in particular, and includes, for example, a rubbing treatment, and a photo-alignment treatment.

Rubbing treatment is a process in which a roller around which a cloth, for example, made of nylon is wound is rotated while being pressed at a constant pressure onto the first substrate 10 and the second substrate 20 each coated with the alignment film 40, such that the surface of the alignment film 40 is rubbed in a given direction.

Photo-alignment treatment is a process in which a photo-alignment film formed of a photo-aligning material is irradiated with a linearly polarized ultraviolet ray, so that the structure of the photo-alignment film in the polarization direction is selectively altered, thereby to bring about anisotropy in the photo-alignment film to impart an alignment azimuth to the liquid crystal molecule. Such a photo-aligning material refers to a material in which a structural change is bought about by irradiation with light (electromagnetic wave) such as ultraviolet light or visible light, thereby exerting properties (ability) of regulating the alignment of liquid crystal molecules located in the vicinity of the changed structure, and in general, materials having changes in the magnitude and/or direction of the alignment regulating force under light irradiation. The photo-aligning material includes materials containing photoreactive sites where reactions such as dimerization (dimer formation), isomerization, photo-Fries rearrangement, and decomposition take place under light irradiation.

Photoreactive sites (functional groups) that are subject to dimerization and isomerization under light irradiation include, for example, cinnamates, chalcones, coumarins, and stilbenes. Photoreactive sites (functional groups) which are subject to isomerization under light irradiation include, for example, azobenzenes. Photoreactive sites that are subject to photo-Fries rearrangement under light irradiation include, for example, phenol ester structures. Photoreactive sites which are subject to decomposition under light irradiation include, for example, cyclobutane structures.

Preferably, the alignment film 40 is a photo-alignment film to which a photo-alignment treatment can be applied. More preferably, the polymer side chain of the polymer contained in the alignment film 40 contains at least one group selected from the group consisting of a cinnamate group, an azobenzene group, a chalcone group, a coumarin group, and a stilbene group. The formation of the alignment film 40 as a photo-alignment film makes it possible to avoid, for example, the occurrence of striped display unevenness when an alignment film for rubbing treatment is used, and the generation of static electricity.

The alignment film 40 preferably contains at least one polymer selected from a polyamic acid and a polyimide. More preferably, the alignment film 40 contains at least one polymer selected from a polyamic acid and a polyimide, and the at least one polymer contains an aliphatic acid anhydride monomer unit. The inclusion of at least one polymer selected from a polyamic acid and a polyimide in the alignment film 40 makes it easier that a monomer represented by Formula (M1) is polymerized to form the aromatic polymer. Here, the aliphatic acid anhydride monomer unit refers to a constituent unit that is derived from a monomer constructing the polymer which has a structure derived from an aliphatic acid anhydride.

In the case when the alignment film 40 contains a polyamic acid, the aliphatic acid anhydride monomer unit preferably has a structure represented by Formula (P-1). In the case when the alignment film 40 contains a polyimide, the aliphatic acid anhydride monomer unit preferably has a structure represented by Formula (P-2):

[Formula 27]

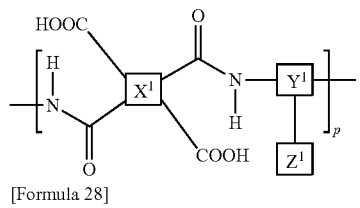

(P-1)

[Formula 28]

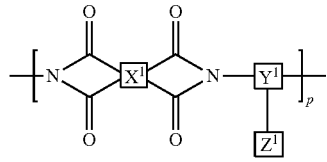

(P-2)

in each of Formulae (P-1) and (P-2), $X^1$ represents a tetravalent aromatic group or aliphatic group, $Y^1$ represents a trivalent aromatic group or aliphatic group, $Z^1$ represents a monovalent organic group or a hydrogen atom, and p represents an integer of 1 or greater.

In each of Formulae (P-1) and (P-2), $X^1$ represents a tetravalent aromatic group or aliphatic group, preferably a tetravalent aliphatic group, more preferably an aliphatic group having 4 to 20 carbon atoms that contains a cyclic structure, and further preferably an aliphatic group having 4 to 20 carbon atoms that contains 1 to 3 alicyclic groups having 4 to 6 carbon atoms. When the aliphatic group contains two or more cyclic structures, these may be bonded directly or via a linking group, or may be condensed to one another. The linking group includes, for example, a hydrocarbon group having 1 to 5 carbon atoms, an —O— group, an —N=N— group, a —C≡C— group, a —CH=CH— group, and a —CO—CH=CH— group. Herein, the aliphatic group is intended to include both cyclic and acyclic aliphatic groups.

Specific examples of $X^1$ include, for example, structures represented by Formulae (X-1) to (X-6). At least one hydrogen atom contained in each of the structures is optionally substituted with a halogen atom, a methyl group, or an ethyl group. In each of Formulae (P-1) and (P-2), $X^1$ particularly preferably has at least one structure selected from the group consisting of structures represented by Formulae (X-1) to (X-6).

[Formula 29]

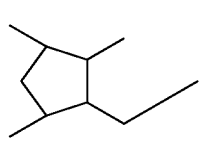

(X-1)

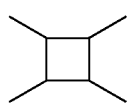

(X-2)

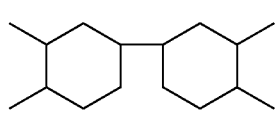

(X-3)

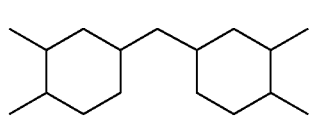

(X-4)

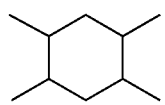

(X-5)

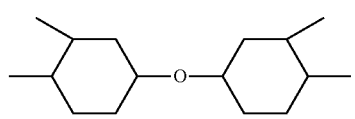

(X-6)

In each of Formulae (P-1) and (P-2), $Y^1$ represents a trivalent aromatic group or aliphatic group, preferably a trivalent aromatic group, more preferably an aromatic group having 6 to 20 carbon atoms, and further preferably an aromatic group having 6 to 20 carbon atoms that contains 1 to 3 aromatic rings having 6 carbon atoms. When the aromatic group contains two or more aromatic rings, these may be bonded directly or via a linking group, or may be condensed to one another. The linking group includes, for example, a hydrocarbon group having 1 to 5 carbon atoms, an —O— group, an —N=N— group, a —C≡C— group, a —CH=CH— group, and a —CO—CH=CH— group.

Specific examples of Y1 include, for example, structures represented by Formulae (Y-1) to (Y-24). At least one hydrogen atom contained in each of the structures is optionally substituted with a halogen atom, a methyl group, or an ethyl group.

[Formula 30]

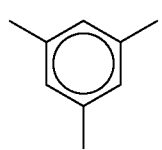

(Y-1)

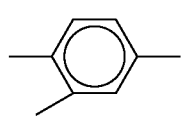

(Y-2)

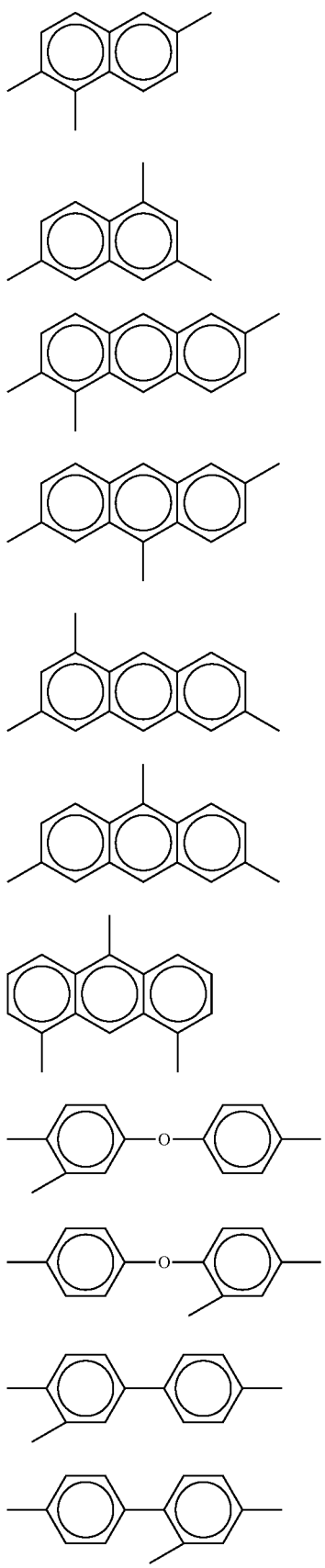
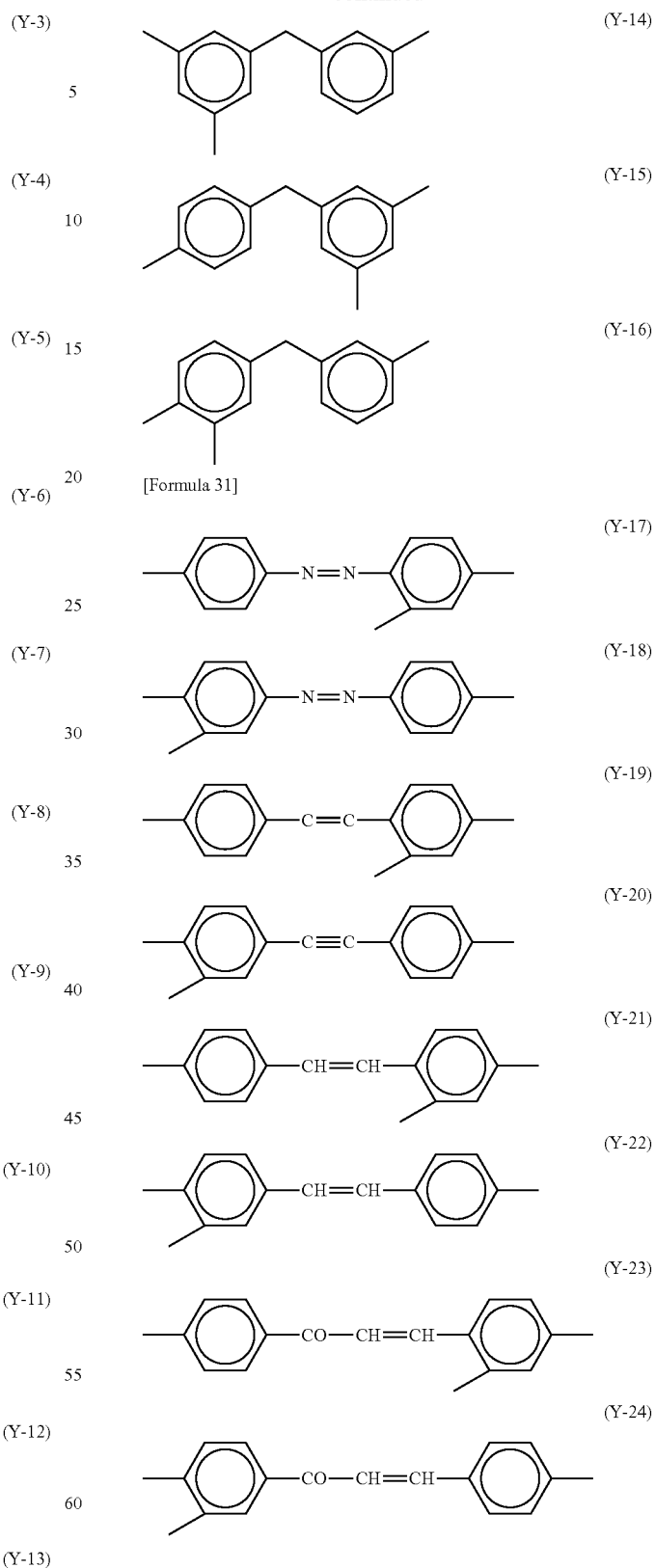
In cases when a rubbing treatment is applied to the alignment film 40, $Y^1$ in each of Formulae (P-1) and (P-2) preferably has a structure represented by any of Formulae (Y-1) to (Y-16). In cases when a photo-alignment treatment is applied to the alignment film 40, $Y^1$ in each of Formulae (P-1) and (P-2) preferably has a structure represented by any of Formulae (Y-17) to (Y-24).

$Z^1$ in each of Formulae (P-1) and (P-2) represents a monovalent organic group or a hydrogen atom. The monovalent organic group is preferably a group represented by —COO—Z. In the group represented by —COO—Z, Z represents a group having 15 to 30 carbon atoms that has a cyclic structure.

Specific examples of $Z^1$ include, for example, structures represented by Formulae (Z-1) to (Z-25). At least one hydrogen atom contained in each of the structures is optionally substituted with a halogen atom, a methyl group, or an ethyl group.

[Formula 32]

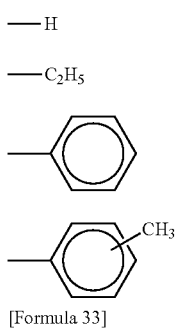

[Formula 33]

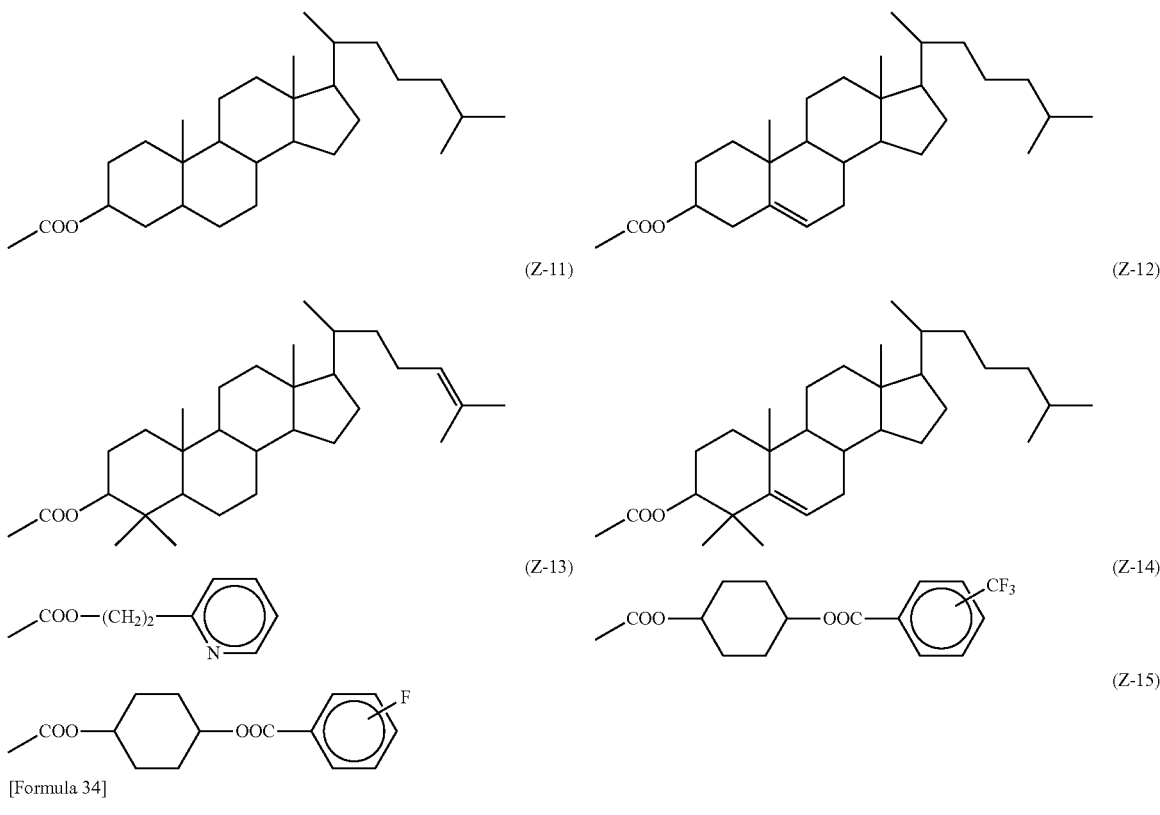

[Formula 34]

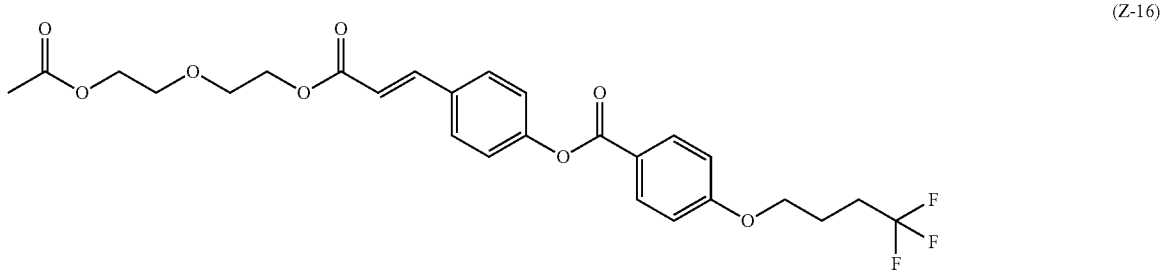

(Z-17)
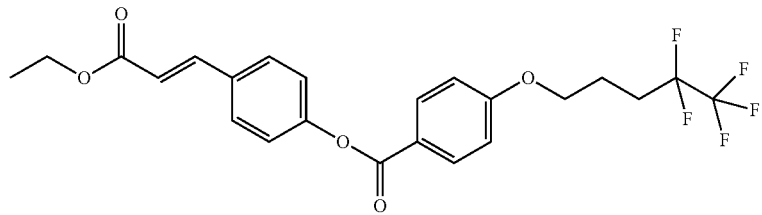
(Z-18)
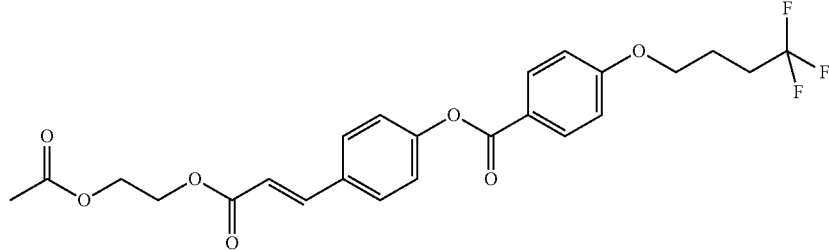
(Z-19)
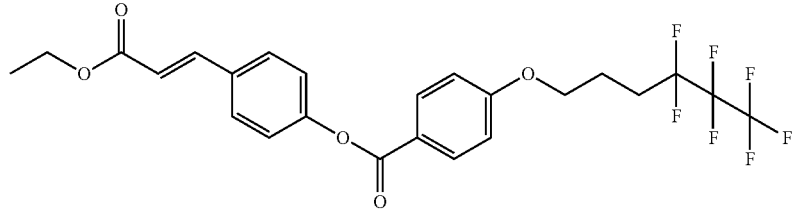
(Z-20)
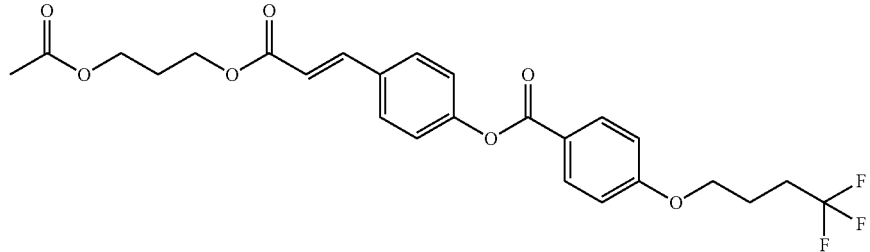
(Z-21)
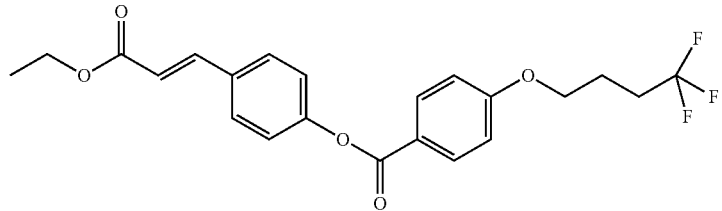
[Formula 35]
(Z-22)
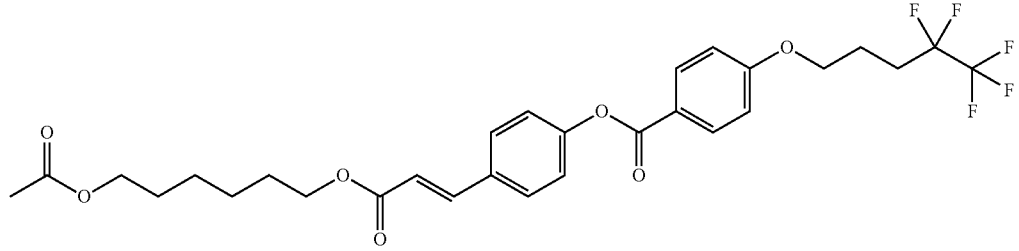

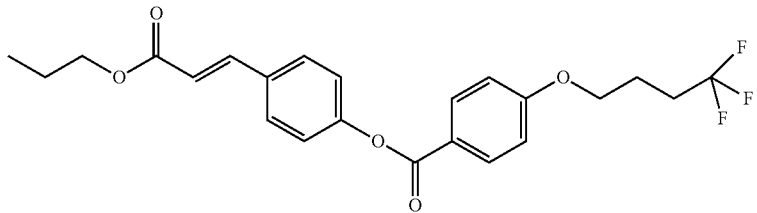

(Z-23)

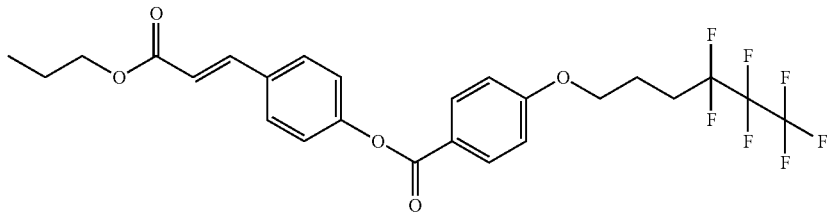

(Z-24)

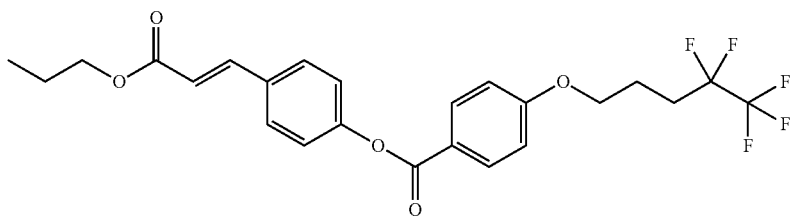

(Z-25)

In cases when a rubbing treatment is applied to the alignment film 40 to form a horizontal alignment film, Z in each of Formulae (P-1) and (P-2) preferably has a structure represented by any of Formulae (Z-1) to (Z-8). In cases when a rubbing treatment is applied to the alignment film 40 to form a vertical alignment film, $Z^1$ in each of Formulae (P-1) and (P-2) preferably has a structure represented by any of Formulae (Z-9) to (Z-15). In cases when a photo-alignment treatment is applied to the alignment film 40 to form a vertical alignment film, $Z^1$ in each of Formulae (P-1) and (P-2) preferably has a structure represented by any of Formulae (Z-16) to (Z-25).

It is preferable that in Formula (P-1), $X^1$ is a tetravalent aliphatic group, $Y^1$ is a trivalent aromatic group, and $Z^1$ is a hydrogen atom or a group represented by —COO—Z. It is more preferable that $X^1$ is an aliphatic group having 4 to 20 carbon atoms that has a cyclic structure, $Y^1$ is an aromatic group having 6 to 20 carbon atoms, and $Z^1$ is a hydrogen atom or a group represented by —COO—Z. It is further preferable that $X^1$ is an aliphatic group having 4 to 20 carbon atoms that contains 1 to 3 alicyclic groups having 4 to 6 carbon atoms, $Y^1$ is an aromatic group having 6 to 20 carbon atoms that contains 1 to 3 aromatic rings having 6 carbon atoms, and $Z^1$ is a hydrogen atom or a group represented by —COO—Z. Note that combinations of preferred substituents defined as $X^1$, $Y^1$, and $Z^1$ in Formula (P-2) are the same as those in Formula (P-1).

When the alignment film 40 contains a polymer having at least one of the structures represented by Formulae (P-1) and (P-2), the polymer preferably has a weight average molecular weight of from 10000 to 1000000, more preferably from 30000 to 200000. The weight average molecular weight of the polymer contained in the alignment film that is within the above range facilitates the formation of a uniform film with a desired film thickness. In cases when the weight average molecular weight of the polymer contained in the alignment film is too small, it is difficult to form a film having a desired film thickness. In cases when the film thickness is increased too much, a uniform film thickness is not achieved and irregularities on the film surface may become noticeable.

In individual molecules of a polymer having the structure represented by any of Formulae (P-1) and (P-2), $X^1$, $Y^1$, and $Z^1$ may each have a structure of one type, or structures of two or more types. The alignment film 40 preferably includes at least one polymer, or may include more than one polymer, of the polymers represented by Formulae (P-1) and (P-2), and may contain, in individual molecules, multiple functional groups selected from the group consisting of a functional group subject to vertical alignment, a functional group subject to horizontal alignment, and a functional group subject to photo-alignment.

At least one polymer of a polyamic acid and a polyimide preferably contains an aliphatic acid anhydride monomer unit. In other words, $X^1$ in each of Formulae (P-1) and (P-2) is preferably an aliphatic group. The reason for this will be described below.

A first reason for this would be as follows. When the alignment film 40 contains a polymer having an aromatic acid anhydride monomer unit, the monomer unit absorbs the ultraviolet ray which is irradiated to form the aromatic polymer by a polymerization reaction. As a result, it becomes difficult to perform the polymerization of the monomer constructing the aromatic polymer, and the remaining monomer molecules leach into the liquid crystal layer 30, leading to a decrease in the VHR and an increase in the residual DC of the liquid crystal display device, and the occurrence of image sticking and others. For this reason, the at least one polymer described above preferably contains an aliphatic acid anhydride monomer unit.

A second reason for this would be as follows. When the aromatic polymer is formed by polymerizing the monomer that has been introduced into the alignment film 40, for example, as is shown in Formula 7 below, the benzyl structure in the monomer constructing the aromatic polymer draws out the hydrogen atom from an amide bond within the polyamic acid contained in the alignment film 40, and forms a radical, resulting in the initiation of the polymerization. Also when the benzyl structure is replaced with a benzophenone structure, the polymerization is initiated in the same manner as in the benzyl structure.

interaction with the hydrogen atom within an amide bond and prevents the reaction of hydrogen abstraction from the benzyl structure as shown in Formula 7. Therefore, when the alignment film 40 contains a polymer having an aromatic acid anhydride monomer unit, the formation of radicals by the reaction of hydrogen abstraction from the benzyl structure is more difficult to occur, making it more difficult that the aromatic polymer is formed. For this reason, the at least one polymer described above preferably contains an aliphatic acid anhydride monomer unit.

[Formula 37]

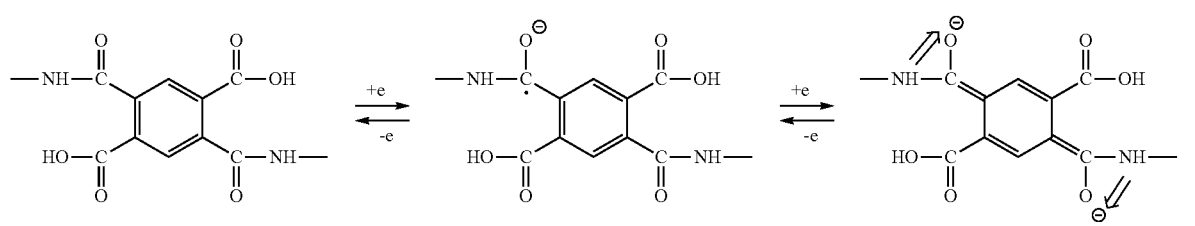

(Formula 8)

[Formula 36]

(Formula 7)

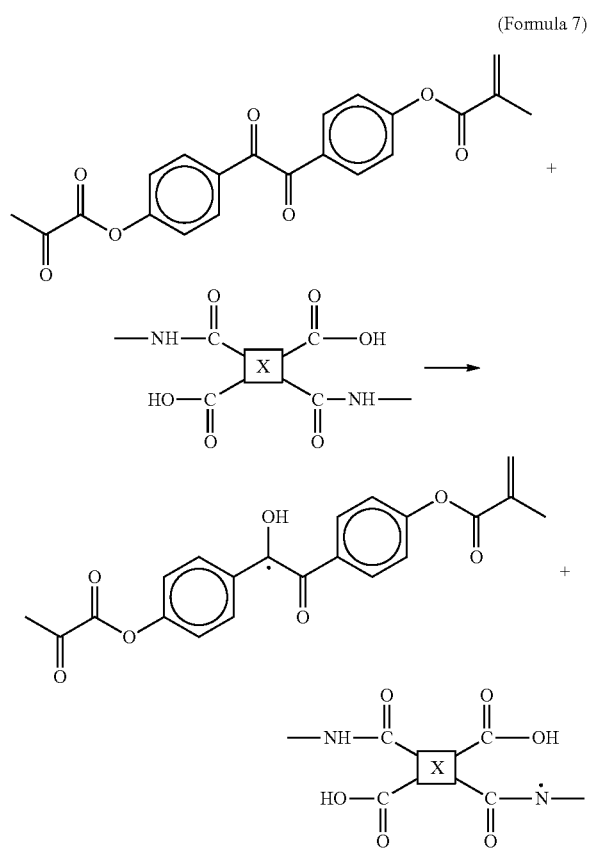

When the alignment film 40 contains a polymer having an aromatic acid anhydride monomer unit, contacting of the reflective electrode 1 containing $A^1$ or the like with the alignment film 40 results in preferential injection of electrons from the reflection electrode 1 into the alignment film 40, leading to the formation of anions. For example, as is shown in Formula 8 below, the anion (0-) forms a charge The alignment mode (display mode) of the reflective liquid crystal display device 100 is not limited in particular, although a vertical alignment (VA) mode is preferable.

The reflective liquid crystal display device 100 is constructed with multiple members, for example, external circuits such as TCPs (tape carrier packages) and PCBs (printed circuit boards), optical films such as a viewing angle expansion film and a luminance improvement film, and a bezel (frame), in addition to the above-mentioned members. Such a member may be incorporated in another member, depending on the member. For members other than the members already described, no particular limitation is imposed thereon, and use can be made of members commonly used in the field of liquid crystal display devices, and thus the explanation thereof is omitted.

Variation 1 of Embodiment 1

A liquid crystal display device according to Variation 1 of Embodiment 1 has the same configuration as in the reflective liquid crystal display device 100 according to Embodiment 1 except that the polymer layer 50 is provided within the alignment film 40. Thus, in this embodiment, characteristics particular to this embodiment will be described, and descriptions overlapping with those of Embodiment 1 will be omitted if unnecessary.

Figure 3:
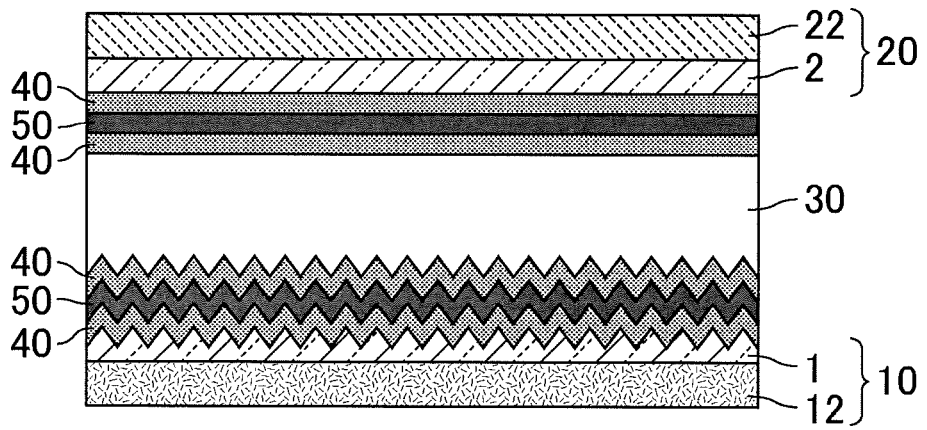
FIG. 3 is a schematic cross-sectional view of a reflective liquid crystal display device according to Variation 1 of Embodiment 1.

FIG. 3 is a schematic cross-sectional view of a reflective liquid crystal display device according to Variation 1 of Embodiment 1. As shown in FIG. 3, a reflective liquid crystal display device according to Variation 1 of Embodiment 1 includes a first substrate 10 provided with a reflective electrode 1; a second substrate 20 facing the first substrate 10; a liquid crystal layer 30 sandwiched between the first substrate 10 and the second substrate 20; an alignment film 40 provided on each of the first substrate 10 and the second substrate 20 on a side facing the liquid crystal layer 30; and a polymer layer 50 provided within the alignment film 40, wherein the polymer layer 50 contains an aromatic polymer having a structure derived from a monomer represented above by Formula (M1).

The first substrate 10 in the reflective liquid crystal display device includes a transparent substrate (not shown), an insulating film 12, and a reflective electrode 1 in order from the transparent substrate toward the liquid crystal layer 30. The second substrate 20 includes a transparent substrate (not shown), a color filter 22, and a common electrode 2 in order from the transparent substrate toward the liquid crystal layer 30.

The presence of the aromatic polymer-containing polymer layer 50 within the alignment film 40 brings about an efficient charge-transfer reaction between the charge generated on the reflective electrode 1 and the aromatic polymer, reduces the possibility that the charge injection into the liquid crystal layer 30 takes place, and suppresses the charge-transfer reaction in the liquid crystal layer 30, thereby allow the device to suppress flickering caused during its driving and image sticking caused by its long-term driving.

Variation 2 of Embodiment 1

A liquid crystal display device according to Variation 2 of Embodiment 1 has the same configuration as in the reflective liquid crystal display device 100 according to Embodiment 1 except that the aromatic polymer is provided within the alignment film 40. Thus, in this embodiment, characteristics particular to this embodiment will be described, and descriptions overlapping with those of Embodiment 1 will be omitted if unnecessary.

Figure 4:
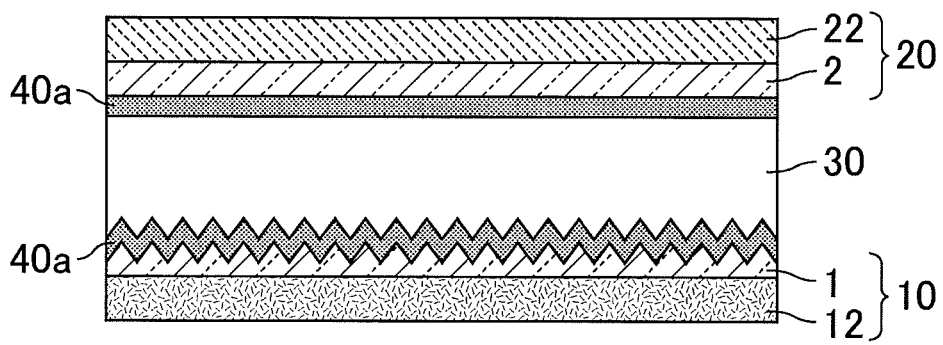
FIG. 4 is a schematic cross-sectional view of a reflective liquid crystal display device according to Variation 2 of Embodiment 1.

FIG. 4 is a schematic cross-sectional view of a reflective liquid crystal display device according to Variation 2 of Embodiment 1. As shown in FIG. 4, a reflective liquid crystal display device according to Variation 2 of Embodiment 1 includes a first substrate 10 provided with a reflective electrode 1; a second substrate 20 facing the first substrate 10; a liquid crystal layer 30 sandwiched between the first substrate 10 and the second substrate 20; and an alignment film 40a containing an aromatic polymer that is provided on each of the first substrate 10 and the second substrate 20 on a side facing the liquid crystal layer 30, wherein the aromatic polymer has a structure derived from a monomer represented above by Formula (M1).

The first substrate 10 in the reflective liquid crystal display device includes a transparent substrate (not shown), an insulating film 12, and a reflective electrode 1 in order from the transparent substrate toward the liquid crystal layer 30. The second substrate 20 includes a transparent substrate (not shown), a color filter 22, and a common electrode 2 in order from the transparent substrate toward the liquid crystal layer 30.

The aromatic polymer-containing alignment film 40a being provided for the device brings about an efficient charge-transfer reaction between the charge generated on the reflective electrode 1 and the aromatic polymer, reduces the possibility that the charge injection into the liquid crystal layer 30 takes place, and suppresses the charge-transfer reaction in the liquid crystal layer 30, thereby allowing the device to suppress flickering caused during its driving and image sticking caused by its long-term driving.

Variation 3 of Embodiment 1

A liquid crystal display device according to Variation 3 of Embodiment 1 has the same configuration as in the reflective liquid crystal display device 100 according to Embodiment 1 except that the aromatic polymer is contained within the alignment film, as well as within the polymer layer 50. Thus, in this embodiment, characteristics particular to this embodiment will be described, and descriptions overlapping with those of Embodiment 1 will be omitted if unnecessary.

Figure 5:
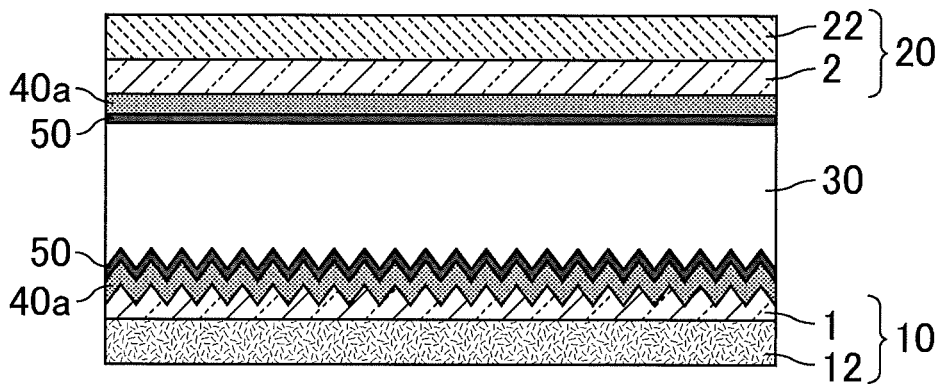
FIG. 5 is a schematic cross-sectional view of a reflective liquid crystal display device according to Variation 3 of Embodiment 1.

FIG. 5 is a schematic cross-sectional view of a reflective liquid crystal display device according to Variation 3 of Embodiment 1. As shown in FIG. 5, a reflective liquid crystal display device according to Variation 3 of Embodiment 1 includes a first substrate 10 provided with a reflective electrode 1; a second substrate 20 facing the first substrate 10; a liquid crystal layer 30 sandwiched between the first substrate 10 and the second substrate 20; an alignment film 40a containing an aromatic polymer that is provided on each of the first substrate 10 and the second substrate 20 on a side facing the liquid crystal layer 30; and a polymer layer 50 provided between the liquid crystal layer 30 and the alignment film 40a containing the aromatic polymer. The alignment film 40a and the polymer layer 50 each contain an aromatic polymer having a structure derived from a monomer represented above by Formula (M1).

The first substrate 10 in the reflective liquid crystal display device includes a transparent substrate (not shown), an insulating film 12, and a reflective electrode 1 in order from the transparent substrate toward the liquid crystal layer 30. The second substrate 20 includes a transparent substrate (not shown), a color filter 22, and a common electrode 2 in order from the transparent substrate toward the liquid crystal layer 30.

The aromatic polymer-containing alignment film 40a and the aromatic polymer-containing polymer layer 50 being provided for the device brings about an efficient charge-transfer reaction between the charge generated on the reflective electrode 1 and the aromatic polymer, reduces the possibility that the charge injection into the liquid crystal layer 30 takes place, and suppresses the charge-transfer reaction in the liquid crystal layer 30, thereby allowing the device to suppress flickering caused during its driving and image sticking caused by its long-term driving.

Embodiment 2

A liquid crystal display device according to Embodiment 2 has the same configuration as in the reflective liquid crystal display device 100 according to Embodiment 1 except that the liquid crystal display device is adapted to have a transflective structure, instead of the reflective structure. Thus, in this embodiment, characteristics particular to this embodiment will be described, and descriptions overlapping with those of Embodiment 1 will be omitted if unnecessary.

Figure 6:
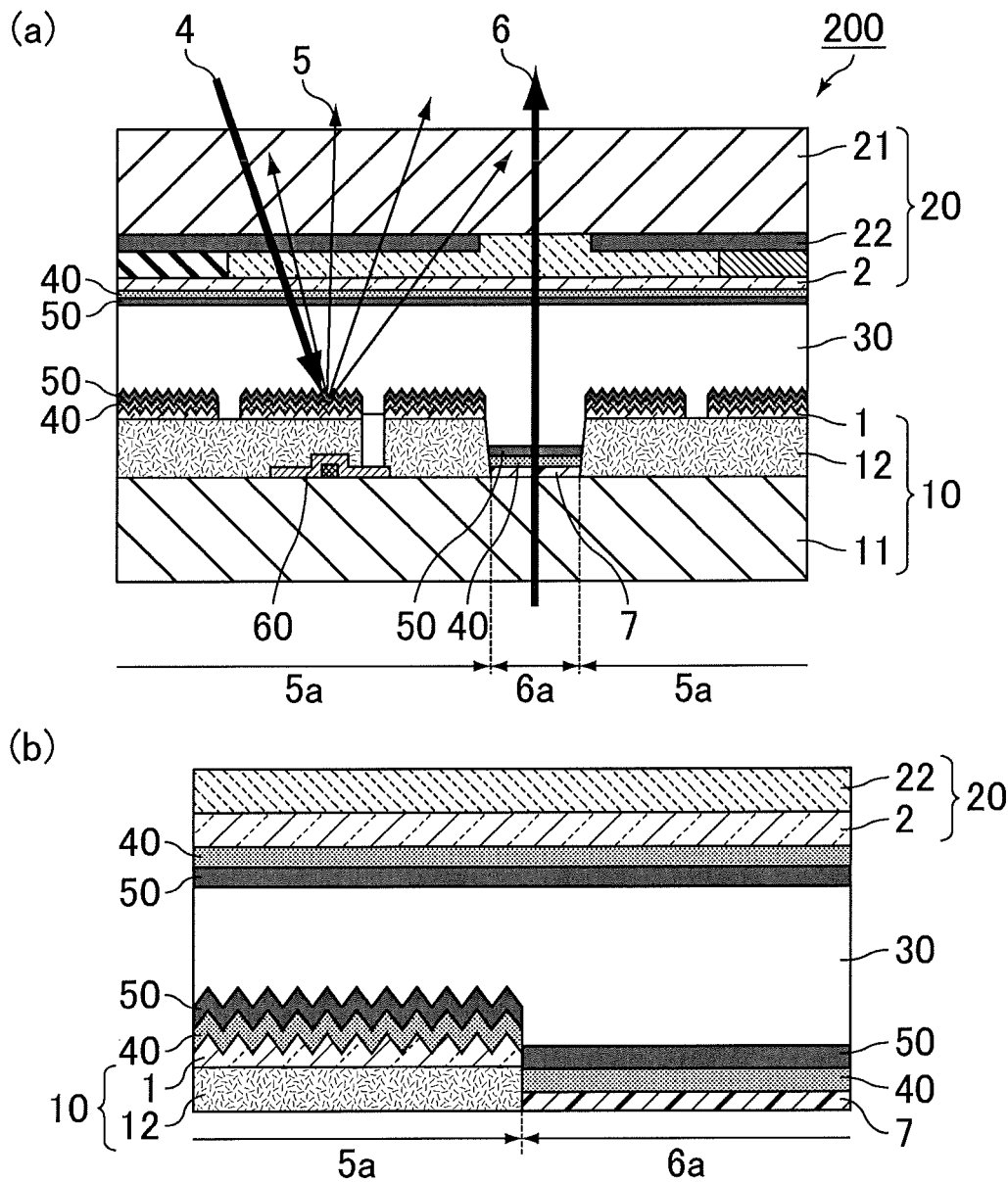
FIG. 6 depicts diagrams showing a transflective liquid crystal display device according to Embodiment 2: (a), a schematic cross-sectional view thereof; and (b), an enlarged schematic cross-sectional view of (a).

FIG. 6 depicts diagrams showing a transflective liquid crystal display device according to Embodiment 2: (a), a schematic cross-sectional view of the transflective liquid crystal display device; and (b), an enlarged schematic cross-sectional view of (a). A transflective liquid crystal display device 200 according to Embodiment 2 includes a light-reflecting section 5a that has the same configuration as in the reflective liquid crystal device 100 according to Embodiment 1, and a light-transmitting section 6a that transmits the light emitted from a backlight 6 to display images. The light-transmitting section 6a includes a transparent electrode 7, an alignment film 40, and a polymer layer 50 provided on a transparent substrate 11 in order from the transparent substrate toward the liquid crystal layer 30. The use of the transparent electrode 7 in the light-transmitting section 6a allows the device to display images using the light emitted from the backlight 6. Such a configuration makes it possible that a charge-transfer reaction occurs more efficiently between the charge on the reflective electrode 1 and the aromatic polymer, and can result in further suppression of the occurrence of flickering and image sticking.

As described above, the transflective liquid crystal display device 200 is a liquid crystal display device which has functions of displaying images both in a transmissive mode and in a reflective mode, and thus combines characteristics of a transmissive liquid crystal display device that high visibility is achieved also in dark places by virtue of having the backlight and characteristics of a reflective liquid crystal display device that low power consumption is achieved due to the use of ambient light.

Variation 1 of Embodiment 2

A liquid crystal display device according to Variation 1 of Embodiment 2 has the same configuration as in the transflective liquid crystal display device 200 according to Embodiment 2 except that the polymer layer 50 is provided within the alignment film 40. Thus, in this embodiment, characteristics particular to this embodiment will be described, and descriptions overlapping with those of Embodiment 2 will be omitted if unnecessary.

Figure 7:
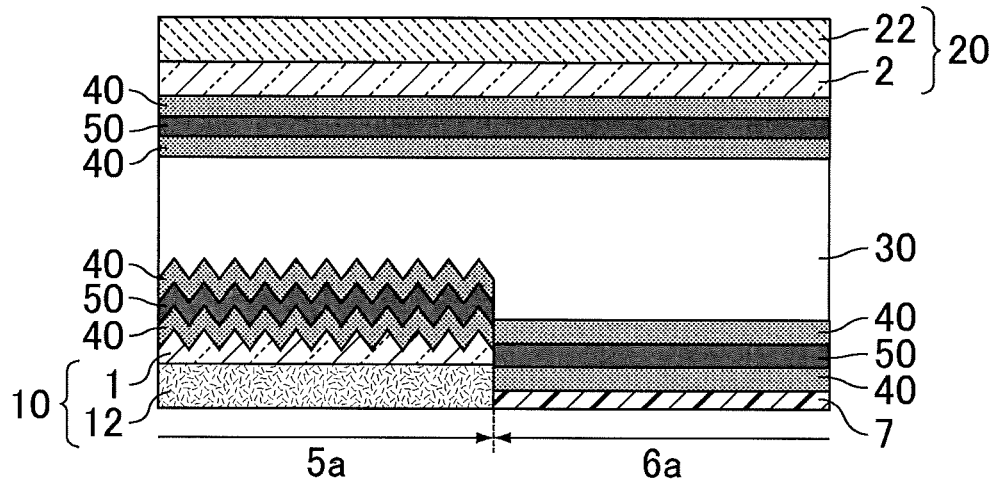
FIG. 7 is a schematic cross-sectional view of a transflective liquid crystal display device according to Variation 1 of Embodiment 2.

FIG. 7 is a schematic cross-sectional view of a transflective liquid crystal display device according to Variation 1 of Embodiment 2. As shown in FIG. 7, a transflective liquid crystal display device according to Variation 1 of Embodiment 2 includes a light-reflecting section 5*a* and a light-transmitting section 6*a*. The light-reflecting section 5*a* located in the first substrate 10 includes an insulating film 12, a reflective electrode 1, and an alignment film 40 provided on a transparent substrate (not shown) in order from the transparent substrate toward the liquid crystal layer 30, wherein the alignment film 40 includes an aromatic polymer-containing polymer layer 50 provided therewithin.

The light-transmitting section 6*a* located in the first substrate 10 includes a transparent electrode 7 and an alignment film 40 provided on a transparent substrate (not shown) from the transparent substrate toward the liquid crystal layer 30, wherein the alignment film 40 includes an aromatic polymer-containing-polymer layer 50 provided therewithin.

The second substrate 20 includes a transparent substrate (not shown), a color filter 22, and a common electrode 2 in order from the transparent substrate toward the liquid crystal layer 30. The alignment film 40 is provided on the common electrode 2 on a side facing the liquid crystal layer 30, and includes an aromatic polymer-containing polymer layer 50 provided therewithin.

The presence of the aromatic polymer-containing polymer layer 50 within the alignment film 40 brings about an efficient charge-transfer reaction between the charge generated on the reflective electrode 1 and the aromatic polymer, reduces the possibility that the charge injection into the liquid crystal layer 30 takes place, and suppresses the charge-transfer reaction in the liquid crystal layer 30, thereby allow the device to suppress flickering caused during its driving and image sticking caused by its long-term driving.

Variation 2 of Embodiment 2

A liquid crystal display device according to Variation 2 of Embodiment 2 has the same configuration as in the transflective liquid crystal display device 200 according to Embodiment 2 except that the aromatic polymer is provided within the alignment film. Thus, in this embodiment, characteristics particular to this embodiment will be described, and descriptions overlapping with those of Embodiment 1 will be omitted if unnecessary.

Figure 8:
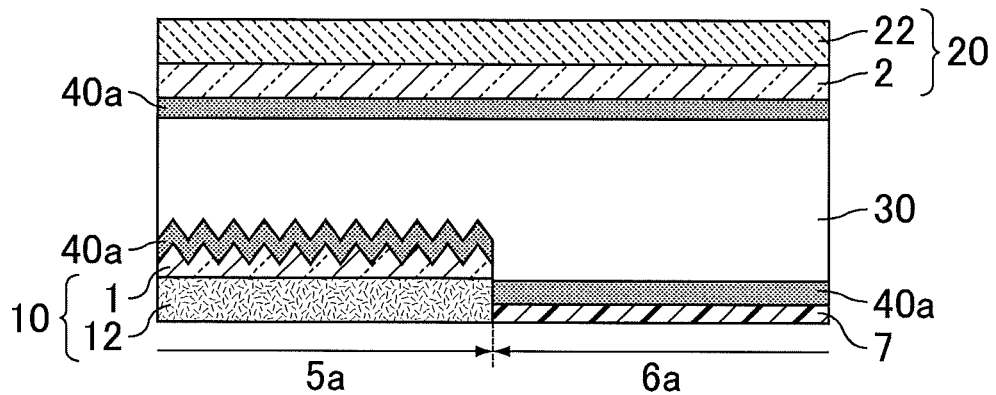
FIG. 8 is a schematic cross-sectional view of a transflective liquid crystal display device according to Variation 2 of Embodiment 2.

FIG. 8 is a schematic cross-sectional view of a transflective liquid crystal display device according to Variation 2 of Embodiment 2. As shown in FIG. 8, a transflective liquid crystal display device according to Variation 2 of Embodiment 2 includes a light-reflecting section 5*a* and a light-transmitting section 6*a*. The light-reflecting section 5*a* located in the first substrate 10 includes an insulating film 12, a reflective electrode 1, and an alignment film 40*a* containing an aromatic polymer, on a transparent substrate (not shown) in order from the transparent substrate toward the liquid crystal layer 30.

The light-transmitting section 6*a* located in the first substrate 10 includes a transparent electrode 7, and an alignment film 40*a* containing an aromatic polymer, on a transparent substrate (not shown) in order from the transparent substrate toward the liquid crystal layer 30.

The second substrate 20 includes a transparent substrate (not shown), a color filter 22, and a common electrode 2 in order from the transparent substrate toward the liquid crystal layer 30. An alignment film 40*a* containing an aromatic polymer is provided on the common electrode 2 on a side facing the liquid crystal layer 30.

The aromatic polymer-containing alignment film 40*a* being provided for the device brings about an efficient charge-transfer reaction between the charge generated on the reflective electrode 1 and the aromatic polymer, reduces the possibility that the charge injection into the liquid crystal layer 30 takes place, and suppresses the charge-transfer reaction in the liquid crystal layer 30, thereby allowing the device to suppress flickering caused during its driving and image sticking caused by its long-term driving.

Variation 3 of Embodiment 2

A liquid crystal display device according to Variation 3 of Embodiment 2 has the same configuration as in the transflective liquid crystal display device 200 according to Embodiment 2 except that the aromatic polymer is contained within the alignment film, as well as within the polymer layer 50. Thus, in this embodiment, characteristics particular to this embodiment will be described, and descriptions overlapping with those of Embodiment 2 will be omitted if unnecessary.

Figure 9:
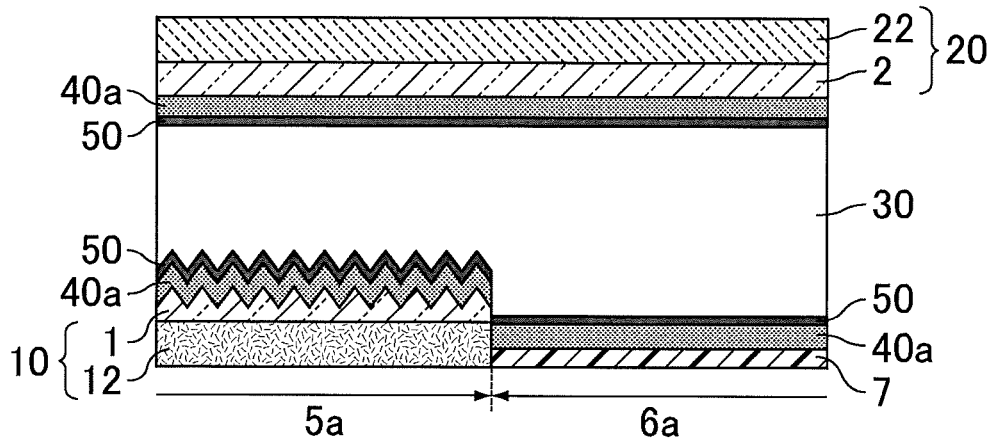
FIG. 9 is a schematic cross-sectional view of a reflective liquid crystal display device according to Variation 3 of Embodiment 2.

FIG. 9 is a schematic cross-sectional view of a transflective liquid crystal display device according to Variation 3 of Embodiment 2. As shown in FIG. 9, a transflective liquid crystal display device according to Variation 3 of Embodiment 2 includes a light-reflecting section 5*a* and a light-transmitting section 6*a*. The light-reflecting section 5*a* located in the first substrate 10 includes an insulating film 12, a reflective electrode 1, an alignment film 40*a* containing an aromatic polymer, and a polymer layer 50, on a transparent substrate (not shown) in order from the transparent substrate toward the liquid crystal layer 30. The alignment film 40*a* and the polymer layer 50 each contain an aromatic polymer having a structure derived from a monomer represented above by Formula (M1).

The light-transmitting section 6*a* located in the first substrate 10 includes a transparent electrode 7, an alignment film 40*a* containing an aromatic polymer, and a polymer layer 50 containing an aromatic polymer, on a transparent substrate (not shown) in order from the transparent substrate toward the liquid crystal layer 30.

The second substrate 20 includes a transparent substrate (not shown), a color filter 22, and a common electrode 2 in order from the transparent substrate toward the liquid crystal layer 30. An alignment film 40a and a polymer layer 50 each containing an aromatic polymer are provided on the common electrode 2 on a side facing the liquid crystal layer 30.

The aromatic polymer-containing alignment film 40a and the aromatic polymer-containing polymer layer 50 being provided for the device brings about an efficient charge-transfer reaction between the charge generated on the reflective electrode 1 and the aromatic polymer, reduces the possibility that the charge injection into the liquid crystal layer 30 takes place, and suppresses the charge-transfer reaction in the liquid crystal layer 30, thereby allowing the device to suppress flickering caused during its driving and image sticking caused by its long-term driving.

Hereinafter, the present invention will be described in more detail based on Examples and Comparative Examples. The Examples, however, are not intended to limit the scope of present invention.

Examples 1-1 to 1-3 and Comparative Example 1

<Preparation of Liquid Crystal Materials>

A liquid crystal material 1R having negative anisotropy of dielectric constant ($\Delta\varepsilon=-5.0$) was provided which contained a liquid crystal compound having a structure represented above by Formula (L).

Then, a monomer represented above by Formula (M1-1) was dissolved at a concentration of 0.3% by weight in the liquid crystal material 1R, and the mixture was allowed to stand for 24 hours in an environment at 25° C. such that the monomer was completely dissolved in the liquid crystal material to prepare a liquid crystal material 1-1. In a similar way, a liquid crystal material 1-2 was prepared using a monomer represented above by Formula (M1-2), and a liquid crystal material 1-3 using a monomer represented above by Formula (M1-3). Note that the concentration of the monomer in the respective liquid crystal materials was based on the mixture after the monomer was added to the liquid crystal material, which was set to 100% by weight.

<Preparation of Reflective Liquid Crystal Cells>

Two substrates were provided: a first substrate 10 in which a reflective electrode 1 made of aluminum was used as a pixel electrode and a second substrate 20 in which a transparent electrode made of IZO was used as a common electrode 2. To the respective substrates was applied a composition for a vertical alignment film containing a polyamic acid having a structure represented by Formula (P-1-1), that is, a polyamic acid containing an aliphatic acid anhydride monomer unit, followed by pre-baking at 80° C. for 2 minutes and then post-baking at 200° C. for 40 minutes before rubbing treatment. Note that the reflective electrode 1 used as a pixel electrode is also referred to hereinafter as a reflective pixel electrode.

[Formula 38]

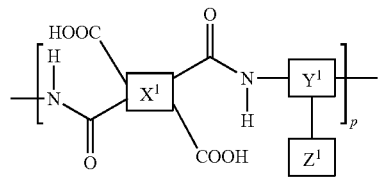

(P-1-1)

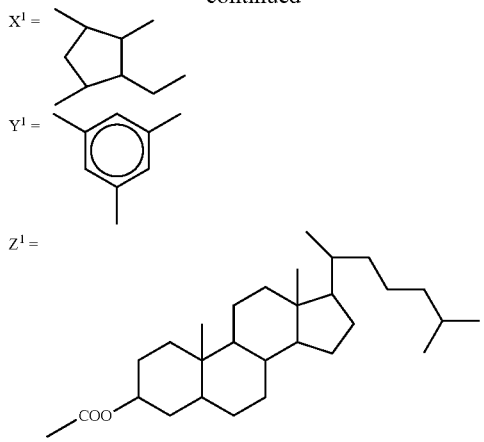

wherein p represents an integer of 1 or greater.

After that, a sealing agent was applied to the first substrate 10 having the reflective pixel electrode. Onto the first substrate 10 was dropped the liquid crystal material 1-1 (with $\Delta\varepsilon\le-5.0$), and the second substrate 20 was then attached to prepare a liquid crystal cell.

The resulting liquid crystal cell was subjected to annealing for 30 minutes at a temperature equal to or higher than Tni (corresponding to the nematic-isotropic transition point of the liquid crystal material) to perform a realignment treatment. Finally, after returning the liquid crystal cell to room temperature, ultraviolet light having a wavelength of 365 nm was irradiated at 10 J/cm² from the side of the second substrate 20 such that a polymer layer 50 containing an aromatic polymer having a structure derived from the monomer represented by Formula (M1-1) was formed between the liquid crystal layer 30 and the alignment film 40 to obtain a liquid crystal cell of Example 1-1. For the ultraviolet light irradiation was used an FHF-32BLB lamp, manufactured by Toshiba Lighting & Technology Corporation.

Further, liquid crystal cells of Examples 1-2 and 1-3 were obtained in the same procedures as in Example 1-1 by changing the liquid crystal material 1-1 to liquid crystal materials 1-2 and 1-3, respectively. In the liquid crystal cells of Examples 1-2 and 1-3, an aromatic polymer-containing polymer layer 50 was formed in the same manner as in Example 1-1.

In addition, a liquid crystal material in which the monomer represented by Formula (M1-1) was omitted from the liquid crystal material 1-1 was provided to produce a liquid crystal cell of Comparative Example 1 in the same procedures as in Example 1-1, except that no ultraviolet light irradiation was applied. No aromatic polymer was formed in the liquid crystal cell of Comparative Example 1.

<Energization Test>

The liquid crystal cells were subjected to energization at 5 V with 60-Hz rectangular wave for 100 hours in an environment of 25° C. to determine the VHR and residual DC before and after energization. The results are shown in Table 1 below. The VHR was measured under conditions of 1 V and 70° C. using a Model 6254 VHR measurement system, manufactured by TOYO Corporation. The residual DC was measured by a flicker minimizing method after application of a DC offset voltage of 2 V for 2 hours. The residual DC is also referred to as rDC.

TABLE 1

| | Monomer for aromatic polymer | Initial (0 hour) | | After 100 hours | |
|---|---|---|---|---|---|
| | | VHR (%) | rDC (V) | VHR (%) | rDC (V) |
| Example 1-1 | M1-1 | 97.5 | 0.16 | 96.3 | 0.45 |
| Example 1-2 | M1-2 | 98.3 | 0 | 98.0 | 0.08 |
| Example 1-3 | M1-3 | 98.4 | 0 | 98.2 | 0.07 |
| Comparative Example 1 | none | 98.8 | 0.23 | 94.4 | 0.75 |

As shown in Table 1, the liquid crystal cell of Comparative Example 1 in which the aromatic polymer-containing polymer layer 50 was not formed had a VHR of 98.8% and a residual DC of 0.23 V at the initial time before energization, and a VHR of 94.4% and a residual DC of 0.75 V after 100 hours of energization, and was ascertained by the energization test to have a significantly reduced VHR and increased residual DC. This is probably because the charge-transfer reaction of electrons injected through the reflective pixel electrode results in the cleavage of the alkoxy group in the liquid crystal compound having the structure represented by Formula (L) and the formation of radicals.

On the other hand, the liquid crystal cell of Example 1-1 in which the aromatic polymer-containing polymer layer 50 was formed using the monomer represented by Formula (M1-1) had a VHR of 97.5% and a residual DC of 0.16 V at the initial time before energization, and a VHR of 96.3% and a residual DC of 0.45 V after 100 hours of energization, and made it possible to suppress the decrease in VHR and the increase in residual DC caused by energization. Likewise, the liquid crystal cells of Examples 1-2 and 1-3 had a VHR of the order of 98% and a residual DC of 0 V at the initial time before energization, and a VHR of the order of 98% and a residual DC of less than 0.1 V after 100 hours of energization, and made it possible to suppress the decrease in VHR and the increase in residual DC caused by energization. Further, in the liquid crystal cells of Examples 1-1 to 1-3, there was observed no flickering during their driving by visual observation.

In addition, the liquid crystal cells of Examples 1-2 and 1-3 using the monomers represented by Formulae (M1-2) and (M1-3), respectively, were found to have a greater effect of suppressing the decrease in VHR and the increase in residual DC, relative to that of Embodiment 1-1 using the monomer represented by Formula (M1-1). The reason for this would be as follows.

Since the level of π conjugation in the biphenyl structure contained in the monomer represented by Formula (M1-1) is lower than that in the monomers represented by Formulae (M1-2) and (M1-3), it is thought that the efficiency of charge-transfer reaction involving the aromatic group (phenylene group) included in the aromatic polymer of Embodiment 1-1 was somewhat lower than that in Examples 1-2 and 1-3.

On the other hand, when a condensed ring as in Formulae (M1-2) and (M1-3) was used, it is thought that since the π conjugation is extended, the efficiency of charge-transfer reaction with the charge injected through the electrode was increased, whereby high VHR and low residual DC were kept also after energization.

As described above, the liquid crystal display devices according to Examples 1-1 to 1-3 retained the VHR at high levels and suppressed the residual DC to low levels in comparison of before and after 100 hours of the energization test, and thus were found capable of suppressing flickering caused during their driving and image sticking caused by their long-term driving.

Example 2-1 and Comparative Example 2

<Preparation of Liquid Crystal Materials>

In the liquid crystal material 1R having negative anisotropy of dielectric constant, which was used in Example 1-1, were dissolved a monomer represented above by Formula (M2-1) at a concentration of 0.03% by weight and a monomer represented above by Formula (M1-1) at a concentration of 0.25% by weight, and the mixture was allowed to stand for 24 hours in an environment at 25° C. such that the monomers were completely dissolved in the liquid crystal material to prepare a liquid crystal material 2-1. In a similar way, a liquid crystal material 2R was prepared by dissolving only a monomer represented above by Formula (M1-1) in the liquid crystal material 1R having negative anisotropy of dielectric constant, which was used in Example 1-1, at a concentration of 0.25% by weight. The a monomer represented by Formula (M2-1) is one that absorbs ultraviolet light up to about 430 nm to form a radical and also one that is capable of polymerization even when ultraviolet irradiation is performed through a color filter. Note that the concentration(s) of the monomer(s) in the respective liquid crystal materials was/were based on the mixture after the monomer(s) was/were added to the liquid crystal material, which was set to 100% by weight.

<Preparation of Reflective Liquid Crystal Cells>

Figure 10:
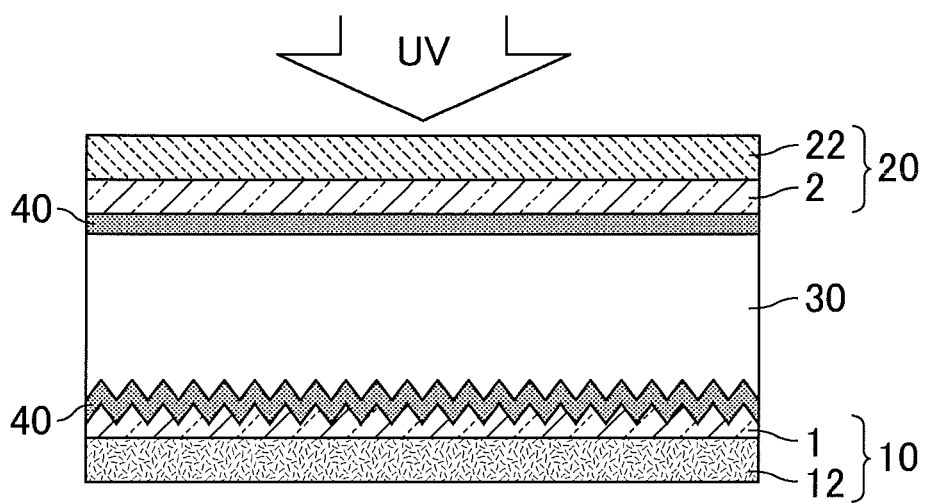
FIG. 10 is a schematic cross-sectional view showing a step of preparing a reflective liquid crystal cell according to Example 2-1.

FIG. 10 is a schematic cross-sectional view showing a step of preparing a reflective liquid crystal cell according to Example 2-1. A first substrate 10 was provided which included a reflective electrode 1 (pixel electrode) formed of two layers, an Al layer and an IZO layer, and an insulating film 12. A second substrate 20 was provided which included a color filter 22 and a common electrode 2 made of IZO.

Subsequently, to the first substrate 10 and the second substrate 20 was applied a composition for a vertical alignment film containing a polyamic acid having a structure represented above by Formula (P-1-1), followed by pre-baking at 80° C. for 2 minutes and then post-baking at 200° C. for 40 minutes before rubbing treatment.

After that, a sealing agent was applied to the first substrate 10. Onto the first substrate was dropped the liquid crystal material 2-1, and then the second substrate 20 was attached to prepare a liquid crystal cell.

The resulting liquid crystal cell was subjected to annealing for 30 minutes at a temperature equal to or higher than Tni to perform a realignment treatment. Finally, after returning the liquid crystal cell to room temperature, ultraviolet light having a wavelength of 365 nm was irradiated at 10 J/cm$^2$ from the side of the second substrate 20 having the color filter 22 such that an aromatic polymer-containing polymer layer 50 was formed between the liquid crystal layer 30 and the alignment film 40 to obtain a liquid crystal cell of Example 2-1. For the ultraviolet light irradiation was used an FHF-32BLB lamp, manufactured by Toshiba Lighting & Technology Corporation.

In addition, the liquid crystal material 2R was used instead of the liquid crystal material in Example 2-1, to produce a liquid crystal cell of Comparative Example 2 in the same procedures as in Example 2-1, except that no ultraviolet light irradiation was applied from the side of the second substrate 20. No aromatic polymer was formed in the liquid crystal cell of Comparative Example 2.

<Energization Test>

The liquid crystal cells of Example 2-1 and Comparative Example 2 were subjected to an energization test using the same procedures as, for example, in Examples 1-1. The results are shown in Table 2 below.

TABLE 2

| | Monomer(s) for aromatic polymer | Initial (0 hour) | | After 100 hours | |
|---|---|---|---|---|---|
| | | VHR (%) | rDC (V) | VHR (%) | rDC (V) |
| Example 2-1 | M1-1 M2-1 | 98.1 | 0.09 | 96.4 | 0.23 |
| Comparative Example 2 | M1-1 (not polymerized) | 94.1 | 0.37 | 85.3 | 0.70 |

As shown in Table 2, Example 2-1 in which the monomer represented by Formula (M2-1) was used in combination with the monomer represented by Formula (M2-1) suppressed the decrease in VHR and the increase in residual DC, whereas Comparative Example 2 without the use of the monomer represented by Formula (M2-1) was found to result in a decreased VHR and also an increased residual DC. This is probably because since the ultraviolet light irradiation was applied from the side of the second substrate 20 having the color filter 22, Example 2-1 in which the monomer represented by Formula (M2-1) was used in combination with the monomer represented by Formula (M2-1), which absorbs light at wavelengths up to about 430 nm, resulted in an efficient polymerization of the monomers and the formation of an aromatic polymer-containing polymer layer 50, whereas Comparative Example 2 without the use of the monomer represented by Formula (M2-1) resulted in the suppression of the monomer polymerization.

The liquid crystal cell of Comparative Example 2 using only the monomer represented by Formula (M1-1) had a low VHR of 94.1% and a high value of residual DC of 0.37 V already at the initial time (0 hour) before energization. After 100 hours of the energization test at 5 V, the VHR decreased down to 85.3% and the residual DC increased up to 0.70 V.

On the other hand, the liquid crystal cell of Example 2-1 in which the monomer represented by Formula (M1-1) was used in combination with the monomer represented by Formula (M2-1) had a VHR of 98.1% and a residual DC of 0.09 V at the initial time before energization, and reached a VHR of 96.4% and a residual DC of 0.23 V after 100 hours of the energization test, allowing the suppression of the decrease in VHR and the increase in residual DC both at the initial time and after 100 hours of the energization test. Furthermore, in the liquid crystal cell of Example 2-1, there was observed no flickering during its driving by visual observation. This indicates that the use of the monomer represented by Formula (M2-1) allowed an efficient polymerization of the monomers even when the ultraviolet light irradiation was applied from the side of the color filter 22, and the formation of the aromatic polymer-containing polymer layer 50.

Example 3-1 and Comparative Example 3

<Preparation of Alignment Films>

An alignment film-forming composition 3-1 was prepared which contained a polyamic acid having a structure represented above by Formula (P-1-1), a monomer represented above by Formula (M1-3), and a monomer represented above by Formula (M2-1). The monomer represented by Formula (M1-3) was added at a concentration of 3% by weight and the monomer represented by Formula (M2-1) was added at a concentration of 0.2% by weight, relative to the polyamic acid. The concentrations of the monomers were based on the total amount of the monomers and the polyamic acid, which was set to 100% by weight.

In addition, an alignment film-forming composition 3R was prepared in the same procedures as in the composition 3-1, except that the polyamic acid in the composition 3-1 was changed to a polyamic acid having a structure represented by Formula (P-1-2). Note that a polyamic acid having a structure represented by Formula (P-1-2) contains an aromatic acid anhydride monomer unit.

[Formula 39]

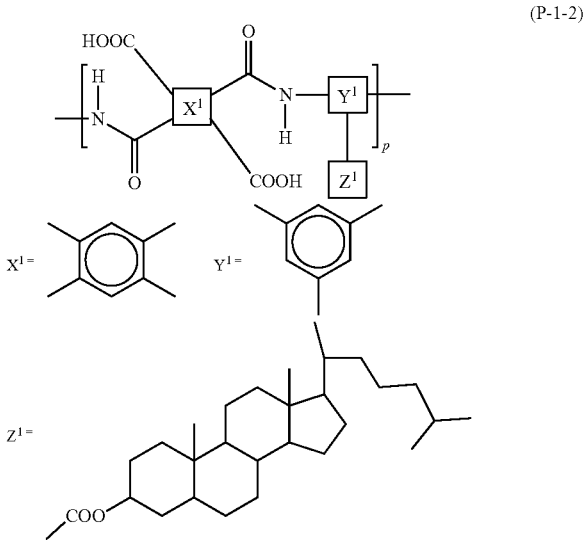

wherein p represents an integer of 1 or greater.

<Preparation of Transflective Liquid Crystal Cells>

Two substrates were provided: a first substrate 10 which had a light-reflecting section 5a including a reflective electrode 1 formed of two layers, an Al layer and an IZO layer, and a light-transmitting section 6a including a transmissive pixel electrode made of ITO; and a second substrate 20 which had a common electrode 2 made of ITO. Subsequently, to the respective substrates was applied the composition 3-1, followed by pre-baking at 80° C. for 2 minutes and then post-baking at 200° C. for 40 minutes before rubbing treatment.

After that, a sealing agent was applied to the first substrate 10. Onto the first substrate was dropped a liquid crystal material having negative anisotropy of dielectric constant ($\Delta\varepsilon \leq -5.0$), and then the second substrate 20 was attached to prepare a liquid crystal cell.

The resulting liquid crystal cell was subjected to annealing for 30 minutes at a temperature equal to or higher than Tni to perform a realignment treatment. Finally, after returning the liquid crystal cell to room temperature, ultraviolet light having a wavelength of 365 nm was irradiated at 10 J/cm² from the side of the second substrate 20 having the color filter 22 such that the monomers within the composition were polymerized to form an aromatic polymer, thereby to obtain a liquid crystal cell of Example 3-1. For the ultraviolet light irradiation was used an FHF-32BLB lamp, manufactured by Toshiba Lighting & Technology Corporation. In addition, a liquid crystal cell of Comparative Example 3 was prepared in the same procedures as in Example 3-1, except that the composition 3-1 in Example 3-1 was changed to the composition 3R.

In the liquid crystal cell of Example 3-1, an alignment film 40a containing the aromatic polymer was formed, and a thin polymer layer 50 containing the aromatic polymer was formed on the aromatic polymer-containing alignment film 40a on a side facing the liquid crystal layer 30. On the other hand, no aromatic polymers were formed in the liquid crystal cell of Comparative Example 3.

<Energization Test>

The liquid crystal cells of Example 3-1 and Comparative Example 3 were subjected to an energization test using the same procedures as, for example, in Examples 1-1. The results are shown in Table 3 below.

TABLE 3

| Alignment film material | Initial (0 hour) | | After 100 hours | |
|---|---|---|---|---|
| | VHR (%) | rDC (V) | VHR (%) | rDC (V) |
| Example 3-1 | P-1-1 | 98.6 | 0.10 | 97.8 | 0.16 |
| Comparative Example 3 | P-1-2 | 96.0 | 0.36 | 92.3 | 1.06 |

As shown in Table 3, the liquid crystal cell of Example 3-1, which used, as a material for the alignment film 40, the polyamic acid containing the aliphatic acid anhydride monomer unit, and had the aromatic polymer formed by the polymerization of the polymerizable monomers represented by Formulae (M1-3) and (M2-1) which had been introduced into the alignment film-forming composition, had a VHR of 98.6% and a residual DC of 0.10 V at the initial time before energization, and a VHR of 97.8% and a residual DC of 0.16 V after 100 hours of the energization test, and suppressed the decrease in VHR and the increase in residual DC. Further, in the liquid crystal cells of Example 3-1, there was observed no flickering during its driving by visual observation.

On the other hand, the liquid crystal cell of Comparative Example 3, which used, as a material of the alignment film, the polyamic acid containing the aromatic acid anhydride monomer unit, had a low VHR of 96.0% and a high residual DC of 0.36 V at the initial time before energization. After 100 hours of the energization test, the liquid crystal cell resulted in a further decrease in VHR down to 92.3% and an increase in residual DC up to 1.06 V. A reason for these results is believed that the aromatic acid anhydride monomer unit contained in the polyamic acid absorbed the ultraviolet light irradiated for the polymerization of the monomers represented by Formulae (M1-3) and (M2-1), making it difficult for the polymerization of the monomers to take place. Another reason is the possibility that between the aromatic acid anhydride monomer unit contained in the polyamic acid and the Al in the reflective electrode 1, electron injection took place from the Al to the aromatic acid anhydride monomer unit, leading to the generation of an anion thereon, which as a result, suppressed the hydrogen abstraction reaction from the monomer represented by Formula (M2-1), and in turn the reaction of forming the polymer layer 50. The results described above indicate that it is preferable that regarding the material for the polyamic acid alignment film, a polyamic acid containing an aliphatic acid anhydride monomer unit is used.

Example 4-1 and Comparative Example 4

<Preparation of Photo-Alignment Films>

An alignment film-forming composition 4-1 was prepared which contained a polyamic acid having a structure represented above by Formula (P-1-3), a monomer represented above by Formula (M1-3), and a monomer represented above by Formula (M2-1). The monomer represented by Formula (M1-3) was added at a concentration of 3% by weight and the monomer represented by Formula (M2-1) was added at a concentration of 0.2% by weight, relative to the polyamic acid. Note that a polyamic acid having a structure represented by Formula (P-1-3) contains an aliphatic acid anhydride monomer unit and is a polymer for a photo-alignment film having a cinnamate group. The concentrations of the monomers were based on the total amount of the monomers and the polyamic acid, which was set to 100% by weight.

[Formula 40]

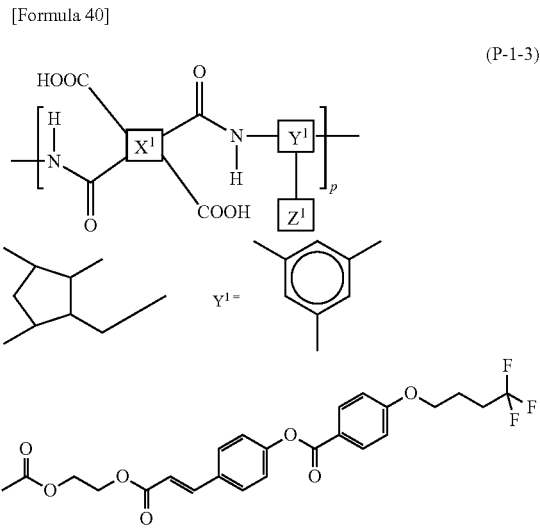

(P-1-3)

wherein p represents an integer of 1 or greater.

In addition, an alignment film-forming composition 4R was prepared in the same procedures as in the composition 4-1, except that the polyamic acid in the composition 4-1 was changed to a polyamic acid having a structure represented by Formula (P-1-4). Note that a polyamic acid having a structure represented by Formula (P-1-4) contains an aromatic acid anhydride monomer unit and is a polymer for a photo-alignment film having a cinnamate group.

[Formula 41]

(P-1-4)

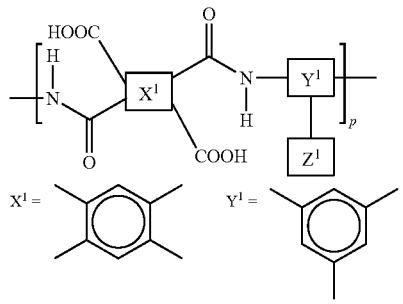

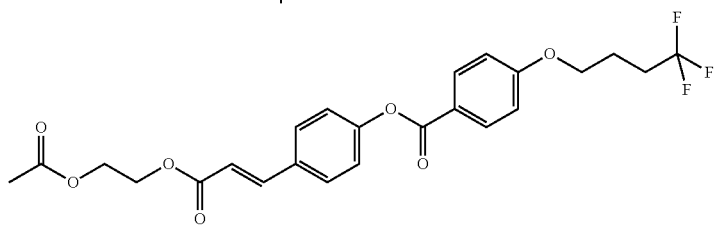

<Preparation of Reflective Liquid Crystal Cells>

Two substrates were provided: a first substrate 10 including a reflective electrode 1 made of Ag and a second substrate 20 having a transparent electrode made of ITO. Subsequently, to the respective substrates was applied the composition 4-1, followed by pre-baking at 80° C. for 2 minutes and then post-baking at 200° C. for 40 minutes, followed by irradiation with polarized ultraviolet light at 25 mJ/cm$^2$ before photo-alignment treatment.

After that, a sealing agent was applied to the first substrate 10. Onto the first substrate was dropped a liquid crystal material having negative anisotropy of dielectric constant ($\Delta\varepsilon \leq -5.0$), and then the second substrate 20 was attached to prepare a liquid crystal cell.

The resulting liquid crystal cell was subjected to annealing for 30 minutes at a temperature equal to or higher than Tni to perform a realignment treatment. Finally, after returning the liquid crystal cell to room temperature, ultraviolet light having a wavelength of 365 nm was irradiated at 10 J/cm$^2$ from the side of the second substrate 20 having the color filter 22 such that the monomer within the alignment film-forming composition was polymerized, thereby forming an aromatic polymer to obtain a liquid crystal cell of Example 4-1. For the ultraviolet light irradiation was used an FHF-32BLB lamp, manufactured by Toshiba Lighting & Technology Corporation. In addition, a liquid crystal cell of Comparative Example 4 was prepared in the same procedures as in Example 4-1, except that the composition 4-1 in Example 4-1 was changed to the composition 4R.

In the liquid crystal cell of Example 4-1, an alignment film 40a containing the aromatic polymer was formed, and a polymer layer 50 containing the aromatic polymer was formed on the aromatic polymer-containing alignment film 40a on a side facing the liquid crystal layer 30. The polymer layer 50 in the liquid crystal cell of Example 4-1 was thinner than the polymer layer 50 of Example 3-1, and the aromatic polymer was mostly present within the alignment film 40. On the other hand, no aromatic polymers were formed in the liquid crystal cell of Comparative Example 4.

<Energization Test>

The liquid crystal cells of Example 4-1 and Comparative Example 4 were subjected to an energization test using the same procedures as, for example, in Examples 1-1. The results are shown in Table 4 below.

TABLE 4

| | Alignment film matrerial | Initial (0 hour) | | After 100 hours | |
|---|---|---|---|---|---|
| | | VHR (%) | rDC (V) | VHR (%) | rDC (V) |
| Example 4-1 | P-1-3 | 98.2 | 0.11 | 97.5 | 0.19 |
| Comparative Example 4 | P-1-4 | 94.0 | 0.66 | 85.0 | 1.40 |

As shown in Table 4, the liquid crystal cell of Example 4-1, which used as a material for the alignment film 40, the polyamic acid containing the aliphatic acid anhydride monomer unit, and had the aromatic polymer formed by the polymerization of the polymerizable monomers represented by Formulae (M1-3) and (M2-1) which had been introduced into the alignment film-forming composition, had a VHR of 98.2% and a residual DC of 0.11 V at the initial time before energization, and a VHR of 97.5% and a residual DC of 0.19 V after 100 hours of the energization test, and suppressed the decrease in VHR and the increase in residual DC. Further, in the liquid crystal cells of Example 4-1, there was observed no flickering during its driving by visual observation.

On the other hand, the liquid crystal cell of Comparative Example 4, which used, as a material of the alignment film, the polyamic acid containing the aromatic acid anhydride monomer unit, had a low VHR of 94.0% and a high residual DC of 0.66 V at the initial time before energization. After 100 hours of the energization test, the liquid crystal cell resulted in a further decrease in VHR down to 85.0% and an increase in residual DC up to 1.40 V. Reasons for these results are believed to be the same as those described in the section titled Example 3-1 and Comparative Example 3.

[Additional Remarks]

An aspect of the present invention can be directed to a liquid crystal display device, such as a reflective liquid crystal display device 100 and a transflective liquid crystal display device 200, including a first substrate 10 provided with a reflective electrode 1 configured to reflect ambient light; a second substrate 20 facing the first substrate 10; a liquid crystal layer 30 sandwiched between the first substrate 10 and the second substrate 20 and containing a liquid crystal material that contains a liquid crystal compound containing an alkoxy group and has negative anisotropy of dielectric constant; an alignment film 40 provided on at least one of the first substrate 10 and the second substrate 20 on a side facing the liquid crystal layer 30; and an aromatic polymer that is present between the liquid crystal layer 30 and the alignment film 40 and/or within the alignment film 40 and has a structure derived from a monomer represented by Formula (M1):

[Formula 42]

$P^1$-$Sp^1$-$R^2$-$A^1$-$(Z$-$A^2)_n$-$R^3$ (M1)

wherein $P^1$ represents a radically polymerizable group;

$Sp^1$ represents a linear, branched, or cyclic alkylene group having 1 to 6 carbon atoms, a linear, branched, or cyclic alkyleneoxy group having 1 to 6 carbon atoms, or a direct bond;

$R^2$ represents an —O— group, an —S— group, an —NH— group, a —CO— group, a —COO— group, an —OCO— group, an —O—COO— group, an —OCH$_2$— group, a —CH$_2$O— group, an —SCH$_2$— group, a —CH$_2$S— group, an —N(CH$_3$)— group, an —N(C$_2$H$_5$)— group, an —N(C$_3$H$_7$)— group, an —N(C$_4$H$_9$)— group, a —CF$_2$O— group, an —OCF$_2$— group, a —CF$_2$S— group, an —SCF$_2$— group, an —N(CF$_3$)— group, a —CH$_2$CH$_2$— group, a —CF$_2$CH$_2$— group, a —CH$_2$CF$_2$— group, a —CF$_2$CF$_2$— group, a —CH═CH— group, a —CF═CF— group, an —C≡C— group, a —CH═CH—COO— group, an —OCO—CH═CH— group, or a direct bond;

Z represents an —O— group, an —S— group, an —NH— group, a —COO— group, a —OCO— group, an —O—COO— group, an —OCH$_2$— group, a —CH$_2$O— group, an —SCH$_2$— group, a —CH$_2$S— group, an —N(CH$_3$)— group, an —N(C$_2$H$_5$)— group, an —N(C$_3$H$_7$)— group, an —N(C$_4$H$_9$)— group, a —CF$_2$O— group, an —OCF$_2$— group, a —CF$_2$S— group, an —SCF$_2$— group, an —N(CF$_3$)— group, a —CH$_2$CH$_2$— group, a —CF$_2$CH$_2$— group, a —CH$_2$CF$_2$— group, a —CF$_2$CF$_2$— group, a —CH═CH— group, a —CF═CF— group, a —C≡C— group, a —CH═CH—COO— group, an —OCO—CH═CH— group, or a direct bond;

$R^3$ represents an —$R^2$-$Sp^1$-$P^1$ group, a hydrogen atom, a halogen atom, a —CN group, an —NO$_2$ group, an —NCO group, an —NCS group, an —OCN group, an —SCN group, an —SF$_5$ group, or a linear or branched alkyl group having 1 to 18 carbon atoms;

$A^1$ and $A^2$ each independently represent a 1,2-phenylene group, a 1,3-phenylene group, a 1,4-phenylene group, a naphthalene-1,4-diyl group, a naphthalene-1,5-diyl group, a naphthalene-2,6-diyl group, a decahydronaphthalene-2,6-diyl group, a 1,2,3,4-tetrahydronaphthalene-2,6-diyl group, a phenanthrene-1,6-diyl group, a phenanthrene-1,8-diyl group, a phenanthrene-2,7-diyl group, a phenanthrene-3,6-diyl group, an anthracene-1,5-diyl group, an anthracene-1,8-diyl group, an anthracene-2,6-group, or an anthracene-2,7-diyl group;

n is 0, 1, or 2;

a hydrogen atom included in $R^3$ is optionally substituted with a fluorine atom or a chlorine atom;

a —CH$_2$— group included in $R^3$ is optionally substituted with an —O— group, an —S— group, an —NH— group, a —CO— group, a —COO— group, an —OCO— group, an —O—COO— group, an —OCH$_2$— group, a —CH$_2$O— group, an —SCH$_2$— group, a —CH$_2$S— group, an —N(CH$_3$)— group, an —N(C$_2$H$_5$)— group, an —N(C$_3$H$_7$)— group, an —N(C$_4$H$_9$)— group, a —CF$_2$O— group, an —OCF$_2$— group, a —CF$_2$S— group, an —SCF$_2$— group, an —N(CF$_3$)— group, a —CH$_2$CH$_2$— group, a —CF$_2$CH$_2$— group, a —CH$_2$CF$_2$— group, a —CF$_2$CF$_2$— group, a —CH═CH— group, a —CF═CF— group, a —C≡C— group, a —CH═CH—COO— group, or an —OCO—CH═CH— group, with the proviso that an oxygen atom and a sulfur atom are not adjacent to each other;

a —CH$_2$— group included in $A^1$ and $A^2$ is optionally substituted with an —O— group or an —S— group, with the proviso that an oxygen atom and a sulfur atom are not adjacent to each other; and one or more hydrogen atoms included in $A^1$ and $A^2$ are each optionally substituted with a fluorine atom, a chlorine atom, a —CN group, an alkyl group having 1 to 6 carbon atoms, an alkoxy group having 1 to 6 carbon atoms, an alkylcarbonyl group having 2 to 6 carbon atoms, an alkoxycarbonyl group having 2 to 6 carbon atoms, or an alkylcarbonyloxy group having 2 to 6 carbon atoms.

The liquid crystal display device includes an aromatic polymer having a structure derived from the monomer represented by Formula (M1), and thus an efficient charge-transfer reaction occurs between the aromatic group on the aromatic polymer and the charge generated on the reflective electrode 1, making it possible to suppress the charge-transfer reaction within the liquid crystal layer 30. This in turn allows the device to suppress flickering caused during its driving and image sticking caused by its long-term driving.

The monomer represented by Formula (M1) may be at least one selected from monomers represented by Formulae (M1-1) to (M1-3):

[Formula 43]

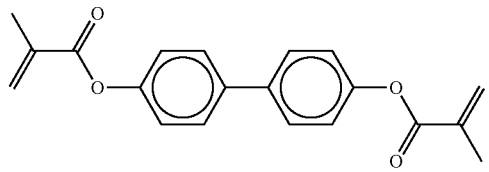

(M1-1)

[Formula 44]

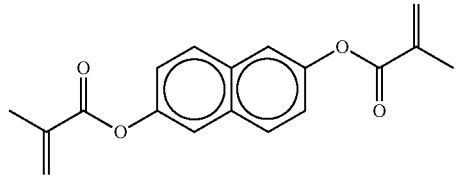

(M1-2)

[Formula 45]

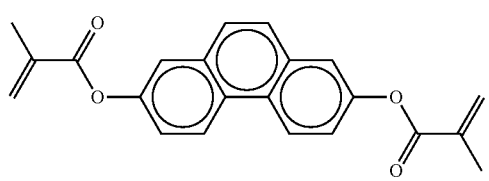

(M1-3)

The liquid crystal compound may have a structure represented by Formula (L). The liquid crystal compound represented by Formula (L) undergoes cleavage by the charge (electron or hole) injected through an electrode, forming radicals and ions (anions or cations), which cause flickering, image sticking, and others. However, according to an embodiment of the present invention, it is possible to achieve the driving of the device at low driving voltage and to suppress flickering caused in the driving of the device and image sticking caused by long-term driving of the device.

[Formula 46]

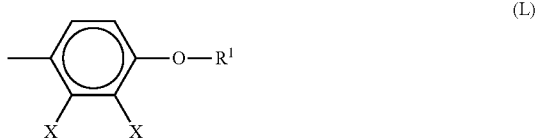

(L)

wherein Xs each independently represent a halogen atom or a hydrogen atom; and $R^1$ represents a hydrocarbon group having 1 to 8 carbon atoms in which a hydrogen atom is optionally substituted with a fluorine atom.

The liquid crystal material may have an anisotropy of dielectric constant of −5.0 or less. Such an embodiment can achieve the driving of the device at lower driving voltage.

The reflective electrode 1 may contain at least one selected from the group consisting of Al, Ag, Cu, Zn, and alloys thereof.

The aromatic polymer may further have a structure derived from a monomer represented by Formula (M2). Monomers represented by Formula (M2) absorb light up to about 430 nm, and thus when the aromatic polymer is synthesized using a monomer represented by Formula (M2) in addition to a monomer represented by Formula (M1), the polymerization of these monomers can be performed also in cases when light irradiation is applied from the side of the color filter substrate.

[Formula 47]

(M2)

wherein $A^3$ and $A^4$ each independently represent a phenyl group, a phenylene group, a biphenyl group, a biphenylene group, a linear or branched alkyl group having 1 to 12 carbon atoms, a linear or a branched alkylene group having 1 to 12 carbon atoms, a linear or branched alkenyl group having 2 to 12 carbon atoms, or a linear or branched alkenylene group having 2 to 12 carbon atoms, and at least one selected from $A^3$ and $A^4$ contains an -$Sp^2$-$P^2$ group;

$P^2$ represents a polymerizable group;

$Sp^2$ represents a linear, branched, or cyclic alkylene group having 1 to 6 carbon atoms, a linear, branched, or cyclic alkyleneoxy group having 1 to 6 carbon atoms, or a direct bond;

m is 1 or 2;

a dotted line connecting $A^3$ and Y and a dotted line connecting $A^4$ and Y together indicate that a bond via Y is optionally present between $A^3$ and $A^4$;

Y represents a —$CH_2$— group, a —$CH_2CH_2$— group, a —CH=CH— group, an —O— group, an —S— group, an —NH— group, an —N($CH_3$)— group, an —N($C_2H_5$)— group, an —N($C_3H_7$)— group, an —N($C_4H_9$)— group, an —$OCH_2$— group, a —$CH_2O$— group, an —$SCH_2$— group, a —$CH_2S$— group, or a direct bond;

a hydrogen atom included in $A^3$ and $A^4$ is optionally substituted with an -$Sp^2$-$P^2$ group, a halogen atom, a —CN group, an —$NO_2$ group, an —NCO group, an —NCS group, an —OCN group, an —SCN group, an —$SF_5$ group, a linear or branched alkyl group having 1 to 12 carbon atoms, a linear or branched alkenyl group having 2 to 12 carbon atoms, or a linear or branched aralkyl group having 7 to 12 carbon atoms;

two adjacent hydrogen atoms included in $A^3$ and $A^4$ are optionally substituted with a linear or branched alkylene group having 1 to 12 carbon atoms or a linear or branched alkenylene group having 2 to 12 carbon atoms to form a cyclic structure;

a hydrogen atom of the alkyl group, the alkenyl group, the alkylene group, the alkenylene group, or the aralkyl group included in $A^3$ and $A^4$ is optionally substituted with an -$Sp^2$-$P^2$ group; and a —$CH_2$— group in the alkyl group, the alkenyl group, the alkylene group, the alkenylene group, or the aralkyl group included in $A^3$ and $A^4$ is optionally substituted with an —O— group, an —S— group, an —NH— group, a —CO— group, a —COO— group, an —OCO— group, an —O—COO— group, an —$OCH_2$— group, a —$CH_2O$— group, an —$SCH_2$— group, a —$CH_2S$— group, an —N($CH_3$)— group, an —N($C_2H_5$)— group, an —N($C_3H_7$)— group, an —N($C_4H_9$)— group, a —$CF_2O$— group, an —$OCF_2$— group, a —$CF_2S$— group, an —$SCF_2$— group, an —N($CF_3$)— group, a —$CH_2CH_2$— group, a —$CF_2CH_2$— group, a —$CH_2CF_2$— group, a —$CF_2CF_2$— group, a —CH=CH— group, a —CF=CF— group, a —C≡C— group, a —CH=CH—COO— group, or an —OCO—CH=CH— group, with the proviso that an oxygen atom, a sulfur atom, and a nitrogen atom are not adjacent to each other.

The monomer represented by Formula (M2) may be a monomer represented by Formula (M2-1). The monomer represented by Formula (M2-1) absorbs light particularly at long wavelengths and is capable of absorbing light at wavelengths up to 430 nm or 440 nm.

[Formula 48]

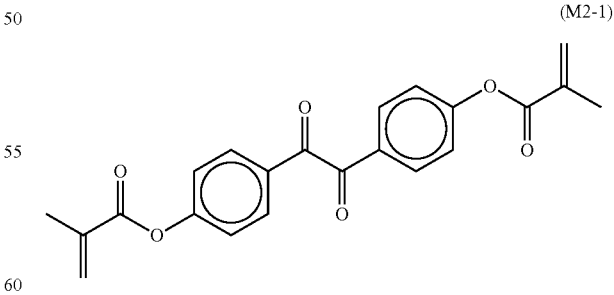

(M2-1)

The alignment film 40 may include at least one polymer selected from a polyamic acid and a polyimide, and the at least one polymer may contain an aliphatic acid anhydride monomer unit. Such an embodiment makes it easier that the monomer represented by Formula (M1) is polymerized to form the aromatic polymer.

The polyamic acid may have a structure represented by Formula (P-1) and the polyimide may have a structure represented by Formula (P-2):

[Formula 49]

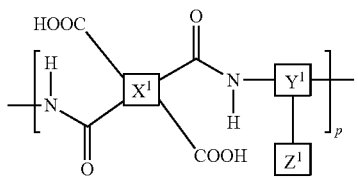
(P-1)

[Formula 50]

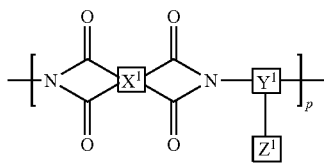
(P-2)

wherein in each of Formulae (P-1) and (P-2), $X^1$ has at least one structure selected from the group consisting of structures represented by Formulae (X-1) to (X-6); $Y^1$ represents a trivalent aromatic or aliphatic group; $Z^1$ represents a monovalent organic group or a hydrogen atom; and p represents an integer of 1 or greater.

[Formula 51]

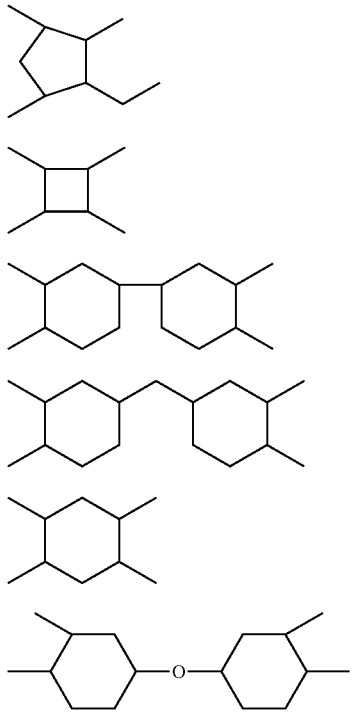

The alignment film 40 may be a vertical alignment film.

REFERENCE SIGNS LIST

1: reflective electrode
2: common electrode
3a: voltage applied through a pixel electrode
3b: voltage applied through a common electrode
3c: a frame interval between applied voltage inputs
4: ambient light
5: reflected light
5a: light-reflecting section
6: backlight
6a: light-transmitting section
7: transparent electrode
10: first substrate
11, 21: transparent substrate
12: insulating film
20: second substrate
22: color filter
30: liquid crystal layer
40: alignment film
40a: aromatic polymer-containing alignment film
50: polymer layer
60: thin-film transistor (TFT)
100: reflective liquid crystal display device
200: transflective liquid crystal display device

The invention claimed is:
1. A liquid crystal display device comprising:
a first substrate provided with a reflective electrode configured to reflect ambient light;
a second substrate facing the first substrate;
a liquid crystal layer sandwiched between the first substrate and the second substrate and containing a liquid crystal material that contains a liquid crystal compound containing an alkoxy group and has negative anisotropy of dielectric constant;
an alignment film provided on at least one of the first substrate and the second substrate on a side facing the liquid crystal layer; and
an aromatic polymer that is present between the liquid crystal layer and the alignment film and/or within the alignment film and has a structure derived from a monomer represented by Formula (M1):

wherein $P^1$ represents a radically polymerizable group;
$Sp^1$ represents a linear, branched, or cyclic alkylene group having 1 to 6 carbon atoms, a linear, branched, or cyclic alkyleneoxy group having 1 to 6 carbon atoms, or a direct bond;
$R^2$ represents an —O— group, an —S— group, an —NH— group, a —CO— group, a —COO— group, an —OCO— group, an —O—COO— group, an —OCH$_2$— group, a —CH$_2$O— group, an —SCH$_2$— group, a —CH$_2$S— group, an —N(CH$_3$)— group, an —N(C$_2$H$_5$)— group, an —N(C$_3$H$_7$)— group, an —N(C$_4$H$_9$)— group, a —CF$_2$O— group, an —OCF$_2$— group, a —CF$_2$S— group, an —SCF$_2$— group, an —N(CF$_3$)— group, a —CH$_2$CH$_2$— group, a —CF$_2$CH$_2$— group, a —CH$_2$CF$_2$— group, a —CF$_2$CF$_2$— group, a —CH═CH— group, a —CF═CF— group, an —C≡C— group, a —CH═CH—COO— group, an —OCO—CH═CH— group, or a direct bond;
Z represents an —O— group, an —S— group, an —NH— group, a —COO— group, a —OCO— group, an —O—COO— group, an —OCH$_2$— group, a —CH$_2$O— group, an —SCH$_2$— group, a —CH$_2$S— group, an —N(CH$_3$)— group, an —N(C$_2$H$_5$)— group, an —N(C$_3$H$_7$)— group, an —N(C$_4$H$_9$)— group, a —CF$_2$O— group, an —OCF$_2$— group, a —CF$_2$S- group, an —SCF$_2$-group, an —N(CF$_3$)-group, a —CH$_2$CH$_2$— group, a —CF$_2$CH$_2$-group, a —CH$_2$CF$_2$— group, a —CF$_2$CF$_2$— group, a —CH=CH— group, a —CF=CF— group, a —C≡C— group, a —CH=CH—COO— group, an —OCO—CH=CH-group, or a direct bond;

$R^3$ represents an —$R^2$-$Sp^1$-$P^1$ group, a hydrogen atom, a halogen atom, a —CN group, an —$NO_2$ group, an —NCO group, an —NCS group, an —OCN group, an —SCN group, an —$SF_5$ group, or a linear or branched alkyl group having 1 to 18 carbon atoms;

$A^1$ and $A^2$ each independently represent a 1,2-phenylene group, a 1,3-phenylene group, a 1,4-phenylene group, a naphthalene-1,4-diyl group, a naphthalene-1,5-diyl group, a naphthalene-2,6-diylgroup, a decahydronaphthalene-2,6-diyl group, a 1,2,3,4-tetrahydronaphthalene-2,6-diyl group, a phenanthrene-1,6-diyl group, a phenanthrene-1,8-diyl group, a phenanthrene-2,7-diyl group, a phenanthrene-3,6-diyl group, an anthracene-1,5-diyl group, an anthracene-1,8-diyl group, an anthracene-2,6-group, or an anthracene-2,7-diyl group;

n is 0, 1, or 2;

a hydrogen atom included in $R^3$ is optionally substituted with a fluorine atom or a chlorine atom;

a —$CH_2$— group included in $R^3$ is optionally substituted with an —O-group, an —S— group, an —NH— group, a —CO— group, a —COO— group, an —OCO— group, an —O—COO— group, an —$OCH_2$— group, a —$CH_2O$— group, an —$SCH_2$— group, a —$CH_2S$— group, an —$N(CH_3)$— group, an —$N(C_2H_5)$— group, an —$N(C_3H_7)$— group, an —$N(C_4H_9)$— group, a —$CF_2O$— group, an —$OCF_2$— group, a —$CF_2S$— group, an —$SCF_2$— group, an —$N(CF_3)$— group, a —$CH_2CH_2$— group, a —$CF_2CH_2$— group, a —$CH_2CF_2$— group, a —$CF_2CF_2$— group, a —CH=CH-group, a —CF=CF— group, a —C≡C— group, a —CH=CH—COO— group, or an —OCO—CH=CH— group, with the proviso that an oxygen atom and a sulfur atom are not adjacent to each other, a —$CH_2$— group included in $A^1$ and $A^2$ is optionally substituted with an —O— group or an —S— group, with the proviso that an oxygen atom and a sulfur atom are not adjacent to each other; and one or more hydrogen atoms included in $A^1$ and $A^2$ are each optionally substituted with a fluorine atom, a chlorine atom, a —CN group, an alkyl group having 1 to 6 carbon atoms, an alkoxy group having 1 to 6 carbon atoms, an alkylcarbonyl group having 2 to 6 carbon atoms, an alkoxycarbonyl group having 2 to 6 carbon atoms, or an alkylcarbonyloxy group having 2 to 6 carbon atoms.

2. The liquid crystal display device according to claim 1, wherein the monomer represented by Formula (M1) is at least one selected from monomers represented by Formulae (M1-1) to (M1-3):

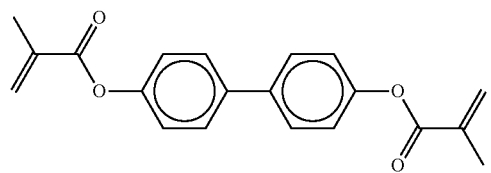
(M1-1)

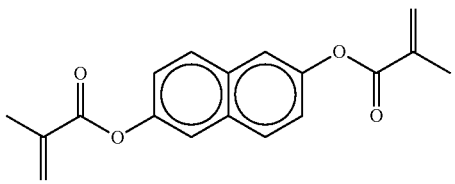
(M1-2)

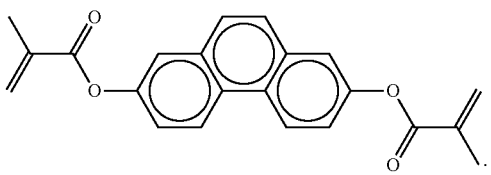
(M1-3)

3. The liquid crystal display device according to claim 1, wherein the liquid crystal compound comprises a group represented by Formula (L):

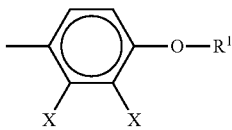
(L)

wherein Xs each independently represent a halogen atom or a hydrogen atom; and R1 represents a hydrocarbon group having 1 to 8 carbon atoms in which a hydrogen atom is optionally substituted with a fluorine atom.

4. The liquid crystal display device according to claim 1, wherein the liquid crystal material has an anisotropy of dielectric constant of −5.0 or less.

5. The liquid crystal display device according to claim 1, wherein the reflective electrode comprises at least one metal selected from the group consisting of Al, Ag, Cu, Zn, and alloys thereof.

6. The liquid crystal display device according to claim 1, wherein the aromatic polymer further comprises a structure derived from a monomer represented by Formula (M2):

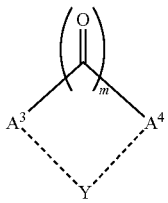
(M2)

wherein $A^3$ and $A^4$ each independently represent a phenyl group, a phenylene group, a biphenyl group, a biphenylene group, a linear or branched alkyl group having 1 to 12 carbon atoms, a linear or a branched alkylene group having 1 to 12 carbon atoms, a linear or branched alkenyl group having 2 to 12 carbon atoms, or a linear or branched alkenylene group having 2 to 12 carbon atoms, and at least one selected from $A^3$ and $A^4$ contains an -$Sp^2$-$P^2$ group;

$P^2$ represents a polymerizable group;

$Sp^2$ represents a linear, branched, or cyclic alkylene group having 1 to 6 carbon atoms, a linear, branched, or cyclic alkyleneoxy group having 1 to 6 carbon atoms, or a direct bond;

m is 1 or 2;

a dotted line connecting $A^3$ and Y and a dotted line connecting $A^4$ and Y together indicate that a bond via Y is optionally present between $A^3$ and $A^4$;

Y represents a —$CH_2$— group, a —$CH_2CH_2$— group, a —CH=CH-group, an —O— group, an —S— group, an —NH— group, an —N(CH3)— group, an —N($C_2H_5$)— group, an —N($C_3H_7$)— group, an —N($C_4H_9$)— group, an —$OCH_2$— group, a —$CH_2O$— group, an —$SCH_2$— group, a —$CH_2S$— group, or a direct bond;

a hydrogen atom included in $A^3$ and $A^4$ is optionally substituted with an -$Sp^2$-$P^2$ group, a halogen atom, a —CN group, an —$NO_2$ group, an —NCO group, an —NCS group, an —OCN group, an —SCN group, an —$SF_5$ group, a linear or branched alkyl group having 1 to 12 carbon atoms, a linear or branched alkenyl group having 2 to 12 carbon atoms, or a linear or branched aralkyl group having 7 to 12 carbon atoms;

two adjacent hydrogen atoms included in $A^3$ and $A^4$ are optionally substituted with a linear or branched alkylene group having 1 to 12 carbon atoms or a linear or branched alkenylene group having 2 to 12 carbon atoms to form a cyclic structure;

a hydrogen atom of the alkyl group, the alkenyl group, the alkylene group, the alkenylene group, or the aralkyl group included in $A^3$ and $A^4$ is optionally substituted with an -$Sp^2$-$P^2$ group; and a —$CH_2$— group in the alkyl group, the alkenyl group, the alkylene group, the alkenylene group, or the aralkyl group included in $A^3$ and $A^4$ is optionally substituted with an —O— group, an —S— group, an —NH— group, a —CO— group, a —COO— group, an —OCO— group, an —O—COO— group, an —$OCH_2$— group, a —$CH_2O$— group, an —$SCH_2$— group, a —$CH_2S$— group, an —N($CH_3$)— group, an —N($C_2H_5$)— group, an —N($C_3H_7$)-group, an —N($C_4H_9$)— group, a —$CF_2O$-group, an —$OCF_2$— group, a —$CF_2S$— group, an —$SCF_2$— group, an —N($CF_3$)— group, a —$CH_2CH_2$— group, a —$CF_2CH_2$— group, a —$CH_2CF_2$— group, a —$CF_2CF_2$— group, a —CH=CH— group, a —CF=CF— group, a —C≡C— group, a —CH=CH—COO— group, or an —OCO—CH=CH— group, with the proviso that an oxygen atom, a sulfur atom, and a nitrogen atom are not adjacent to each other.

7. The liquid crystal display device according to claim 6, wherein the monomer represented by Formula (M2) is a monomer represented by Formula (M2-1):

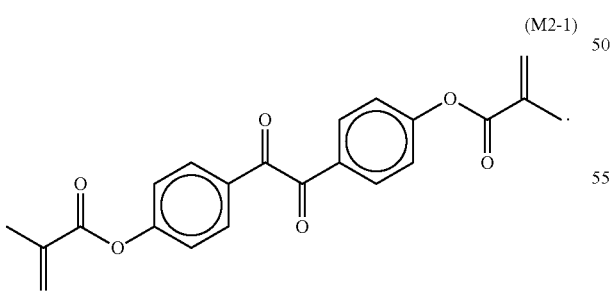

(M2-1)

8. The liquid crystal display device according to claim 1, wherein the alignment film comprises at least one polymer selected from a polyamic acid and a polyimide, and the at least one polymer contains an aliphatic acid anhydride monomer unit.

9. The liquid crystal display device according to claim 8, wherein the polyamic acid has a structure represented by Formula (P-1), and the polyimide has a structure represented by Formula (P-2):

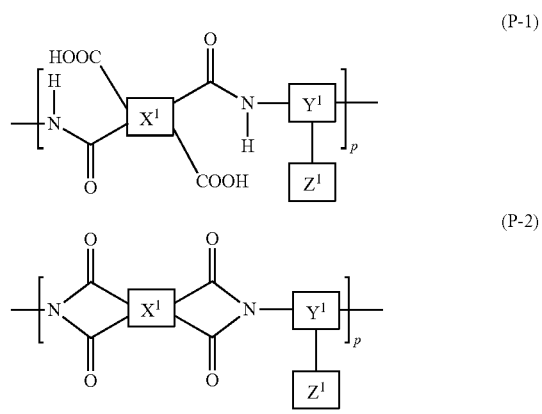

wherein in each of Formulae (P-1) and (P-2), $X^1$ has at least one structure selected from the group consisting of structures represented by Formulae (X-1) to (X-6); $Y^1$ represents a trivalent aromatic or aliphatic group; $Z^1$ represents a monovalent organic group or a hydrogen atom; and p represents an integer of 1 or greater,

(X-1)

(X-2)

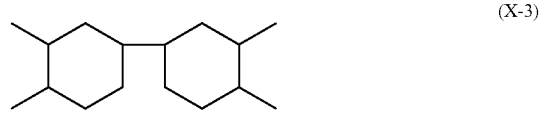
(X-3)

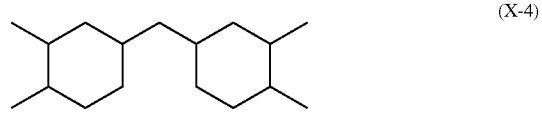
(X-4)

(X-5)

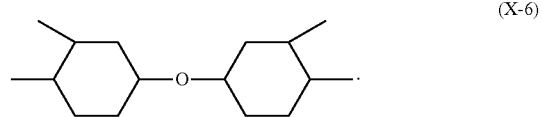
(X-6)

10. The liquid crystal display device according to claim 1, wherein the alignment film is a vertical alignment film.

* * * * *